Figure 12:
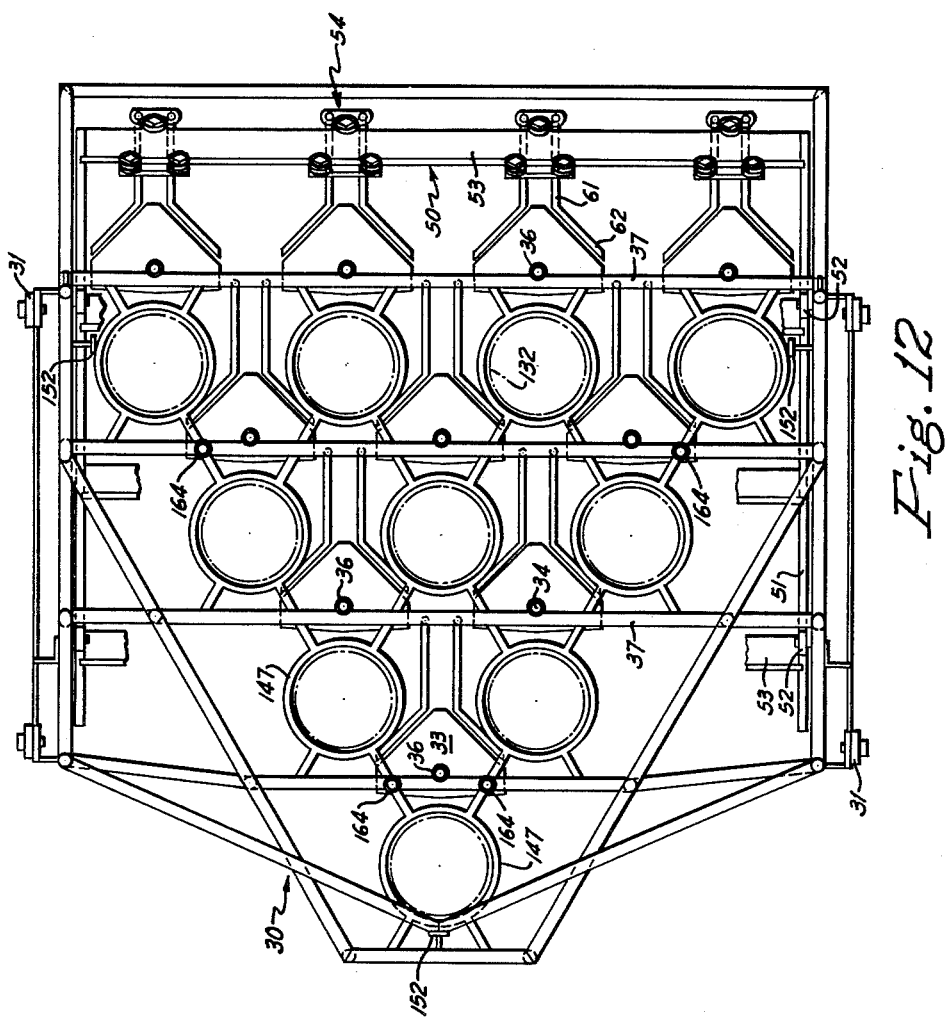

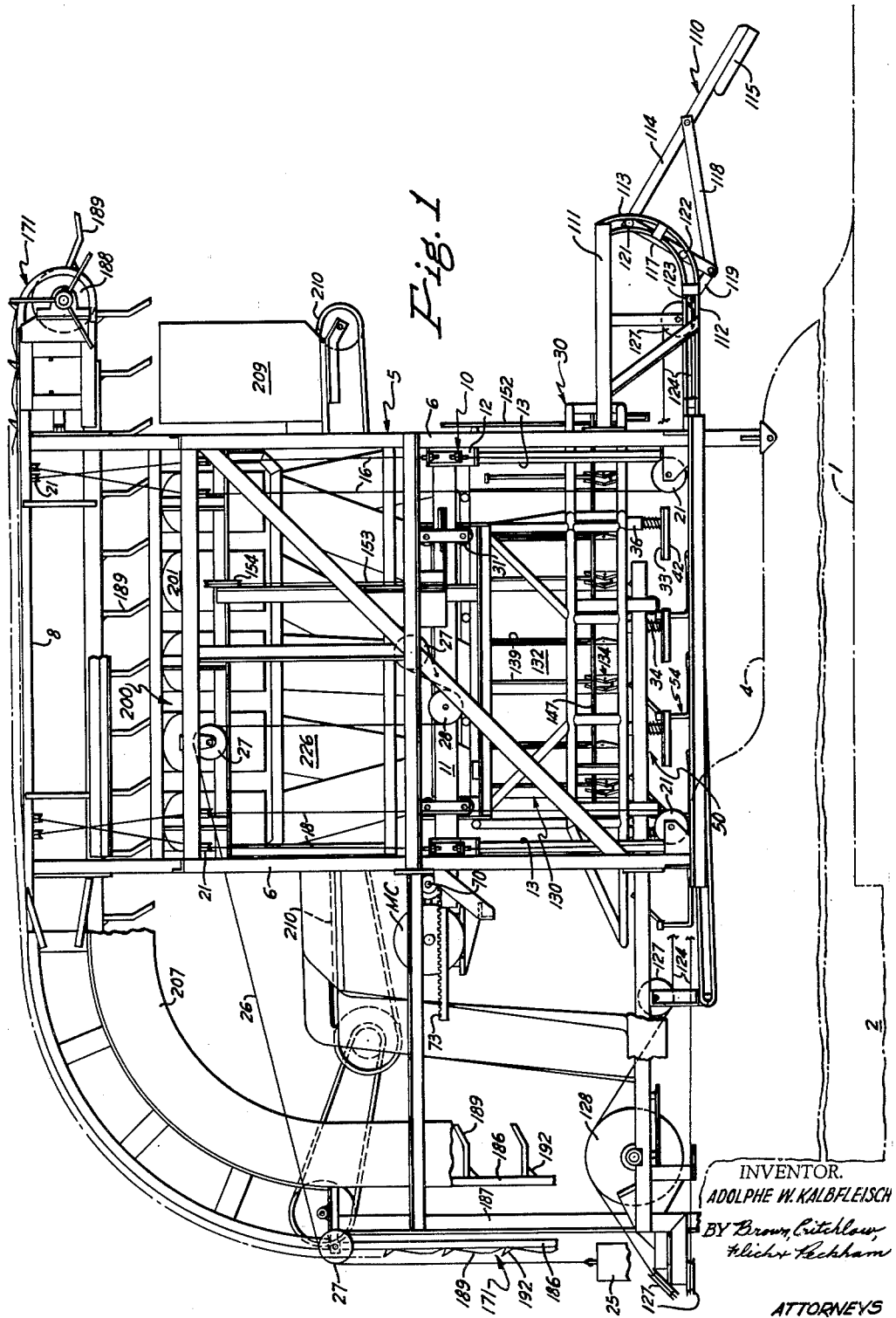
Aug. 7, 1962        A. W. KALBFLEISCH        3,048,398
BOWLING PIN HANDLING MACHINE
Filed Jan. 9, 1959                           17 Sheets-Sheet 1
INVENTOR.
ADOLPHE W. KALBFLEISCH
BY Brown, Critchlow,
Flick & Peckham
ATTORNEYS

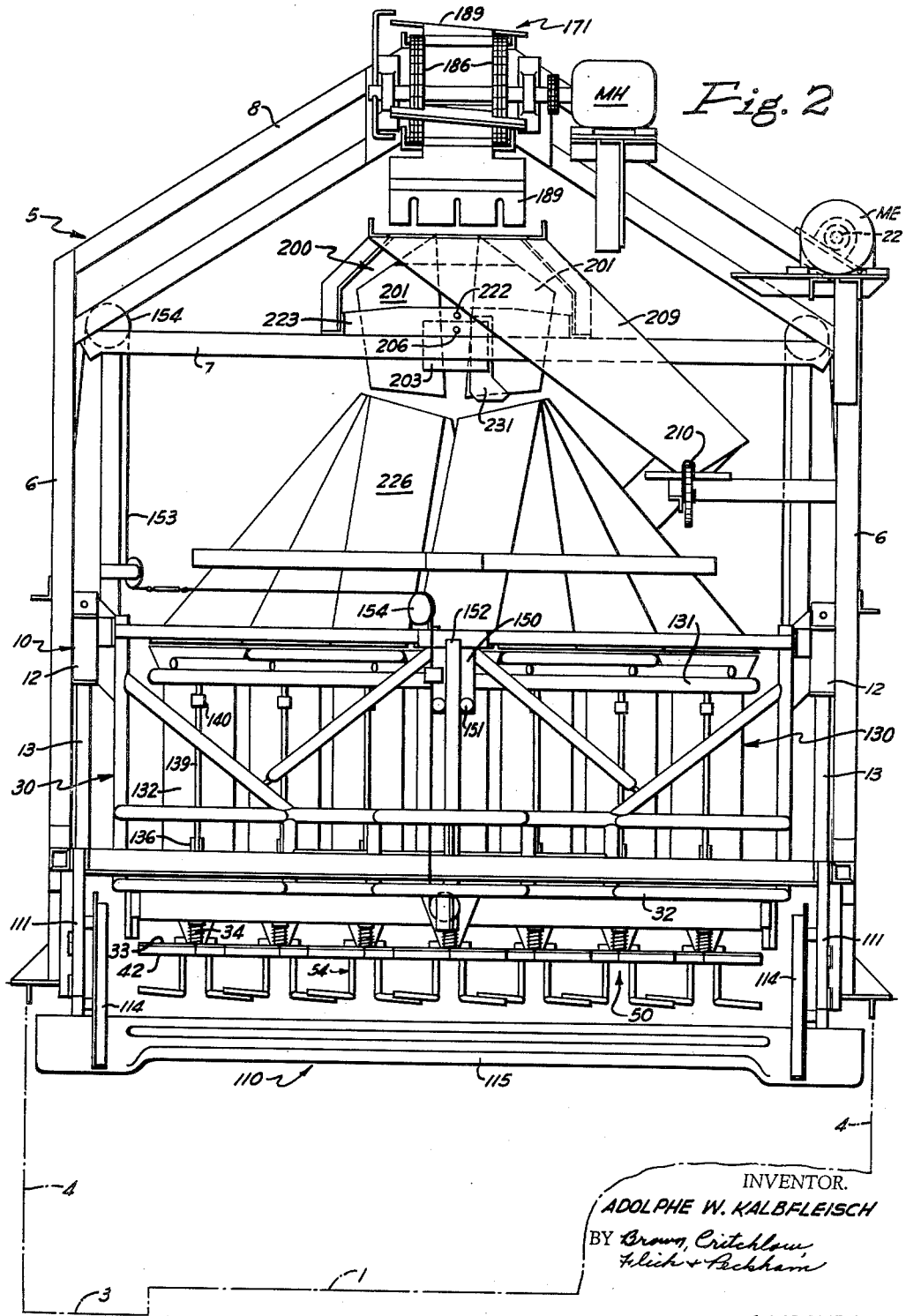

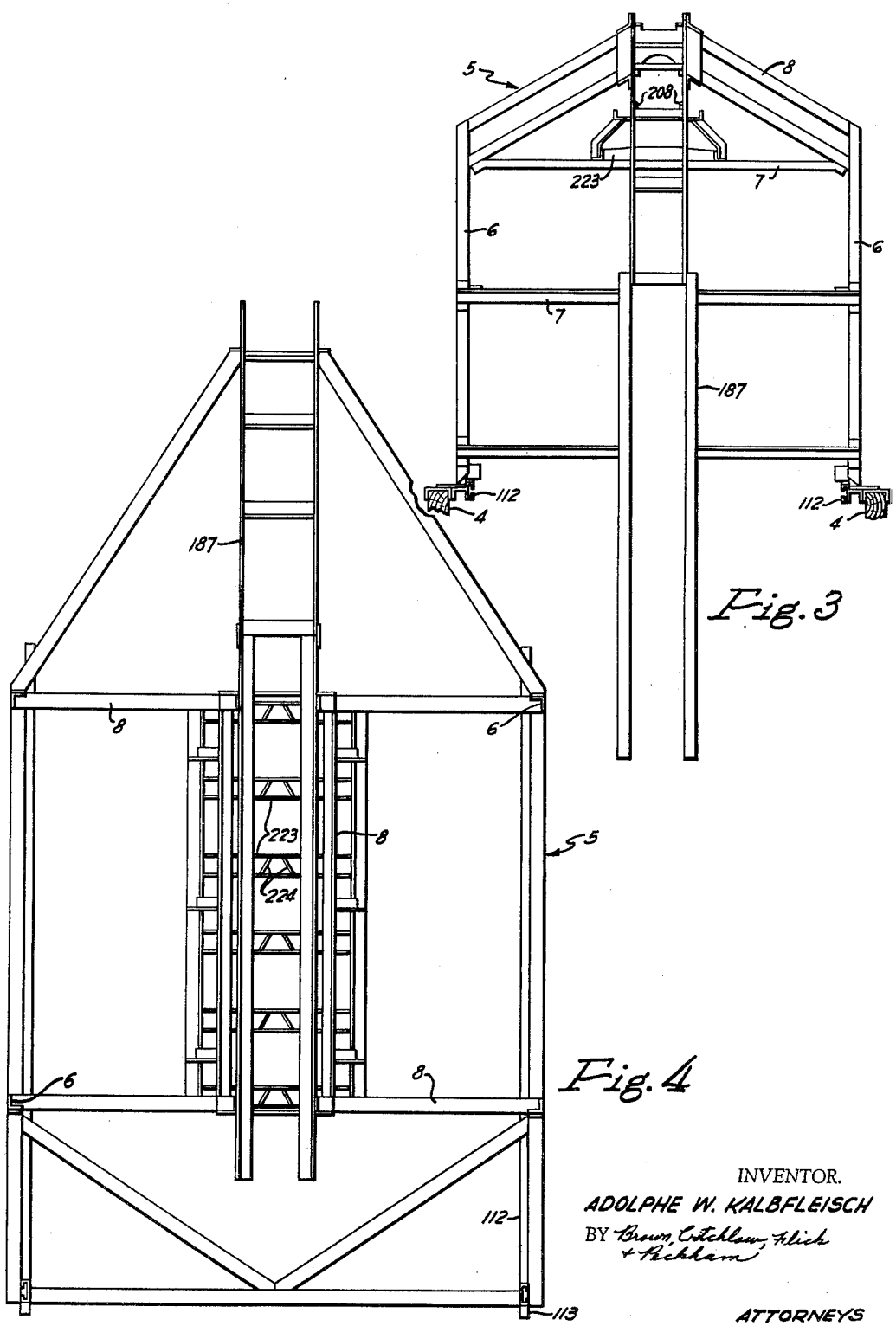

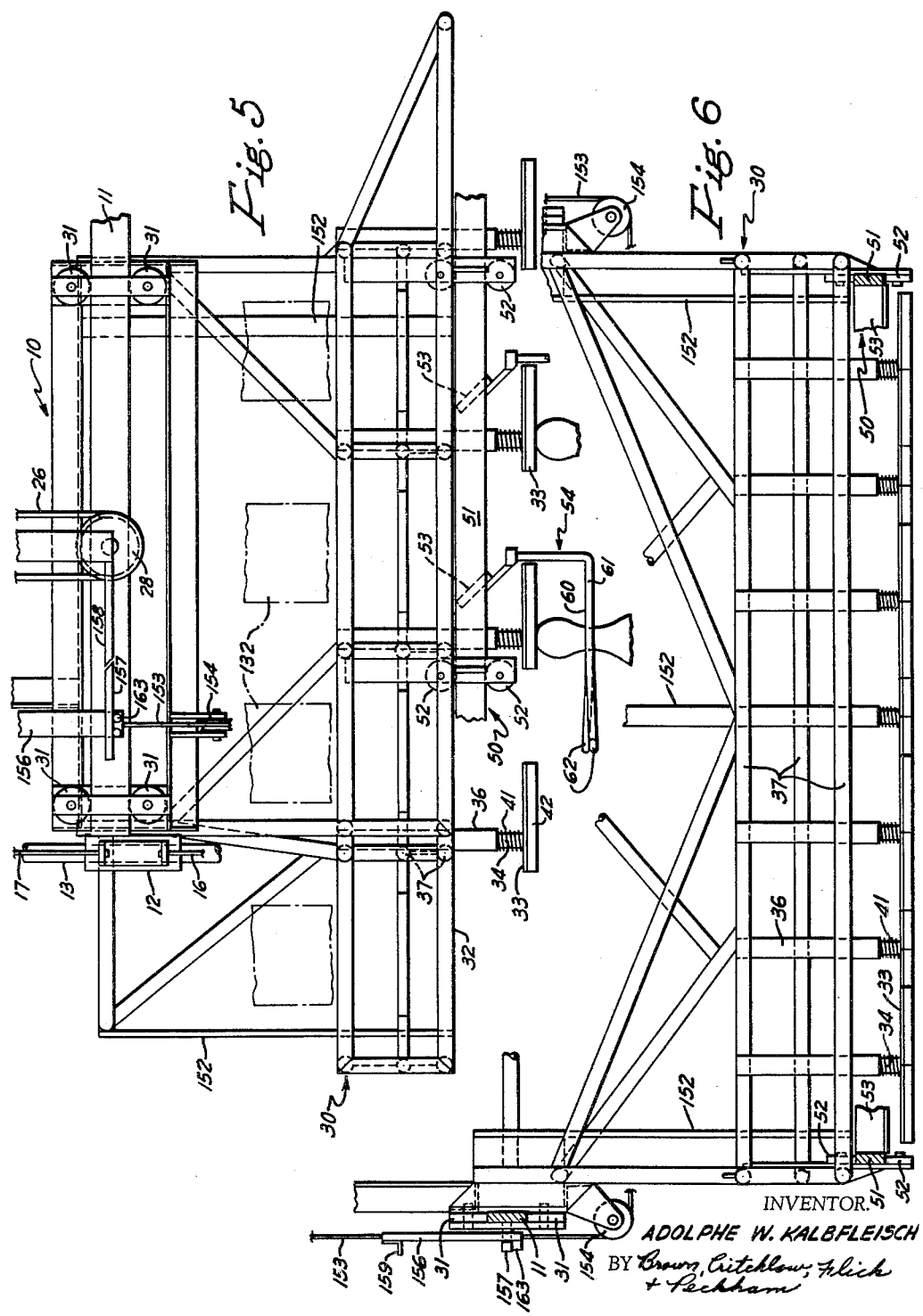

Aug. 7, 1962 A. W. KALBFLEISCH 3,048,398
BOWLING PIN HANDLING MACHINE
Filed Jan. 9, 1959 17 Sheets-Sheet 5
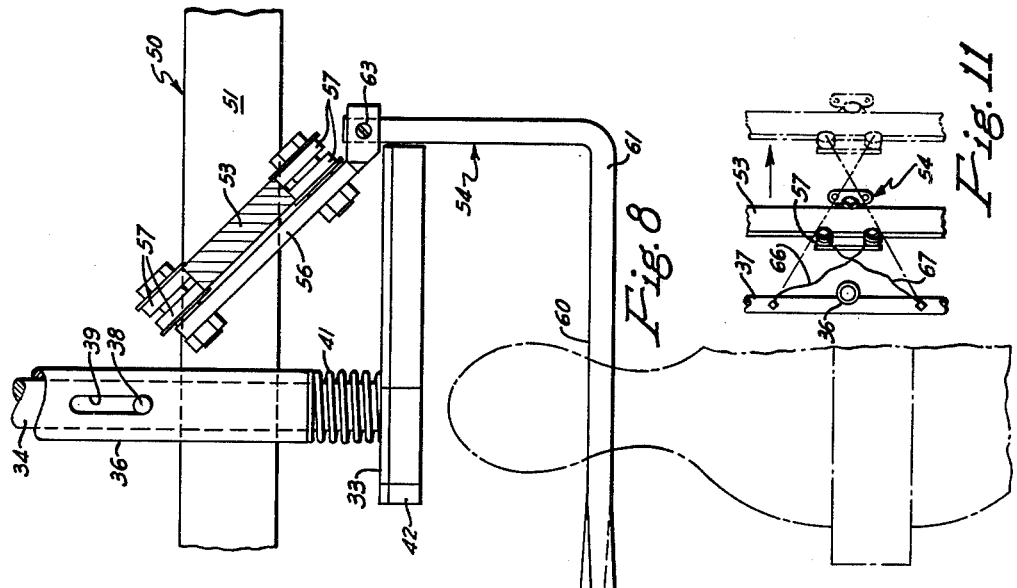
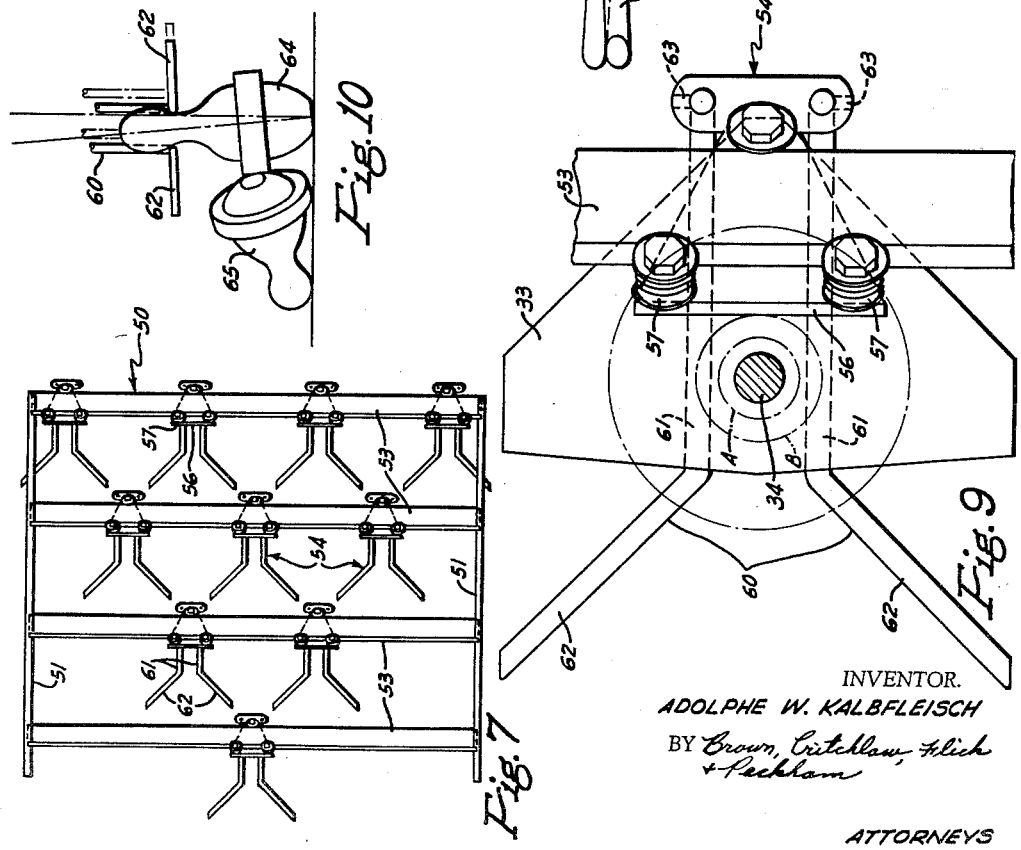
INVENTOR.
ADOLPHE W. KALBFLEISCH
BY Brown, Critchlow, Flick
＋Peckham
ATTORNEYS Aug. 7, 1962 A. W. KALBFLEISCH 3,048,398
BOWLING PIN HANDLING MACHINE
Filed Jan. 9, 1959 17 Sheets-Sheet 6

INVENTOR.
ADOLPHE W. KALBFLEISCH
BY Brown, Critchlow, Flick
& Peckham

ATTORNEYS

Aug. 7, 1962 A. W. KALBFLEISCH 3,048,398
BOWLING PIN HANDLING MACHINE
Filed Jan. 9, 1959 17 Sheets-Sheet 7

INVENTOR.
ADOLPHE W. KALBFLEISCH
BY Brown, Critchlow
Flick & Peckham
ATTORNEYS

Aug. 7, 1962  A. W. KALBFLEISCH  3,048,398
BOWLING PIN HANDLING MACHINE
Filed Jan. 9, 1959  17 Sheets-Sheet 8
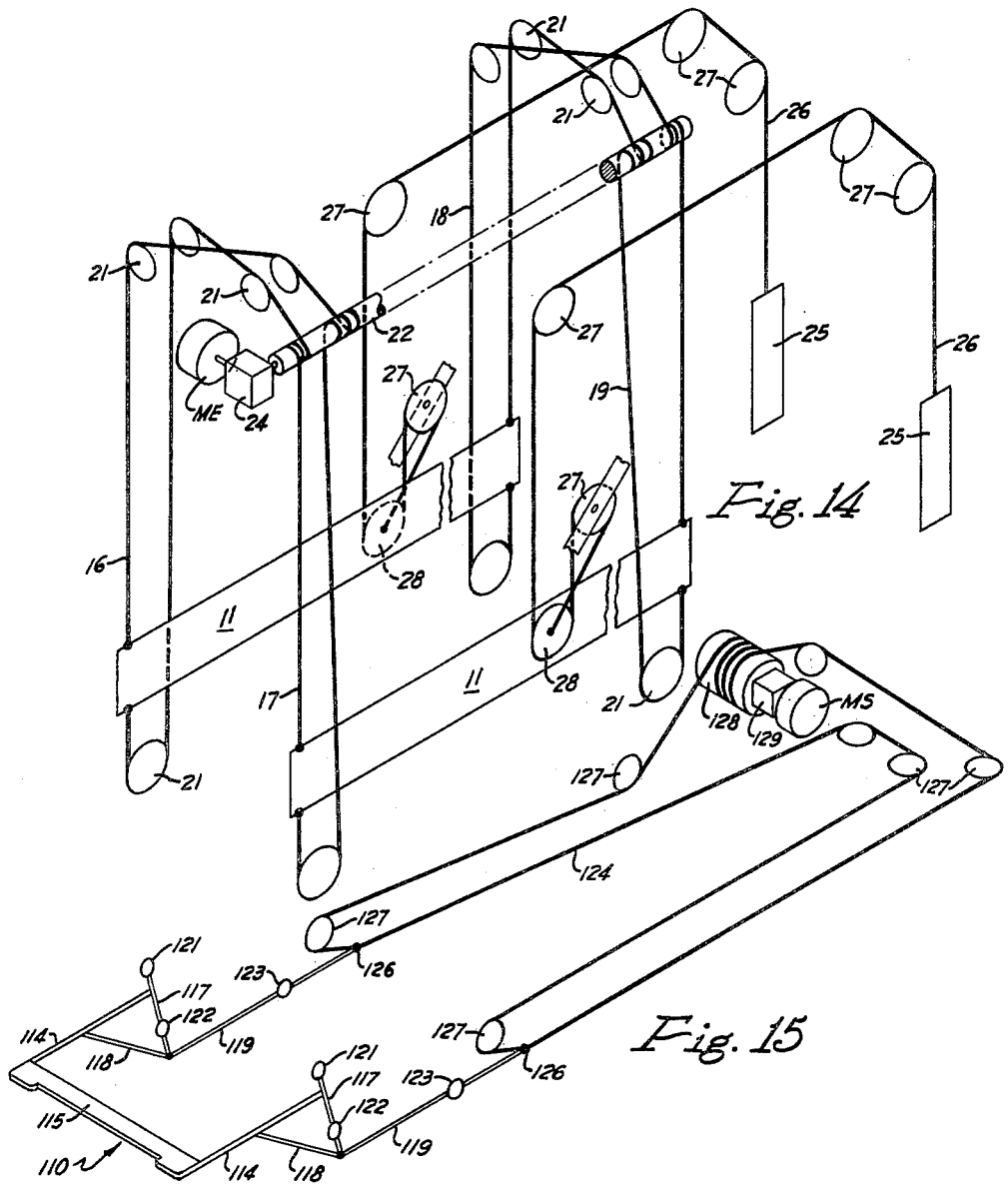
INVENTOR.
ADOLPHE W. KALBFLEISCH
BY Brown, Critchlow, Flick
 & Peckham
ATTORNEYS

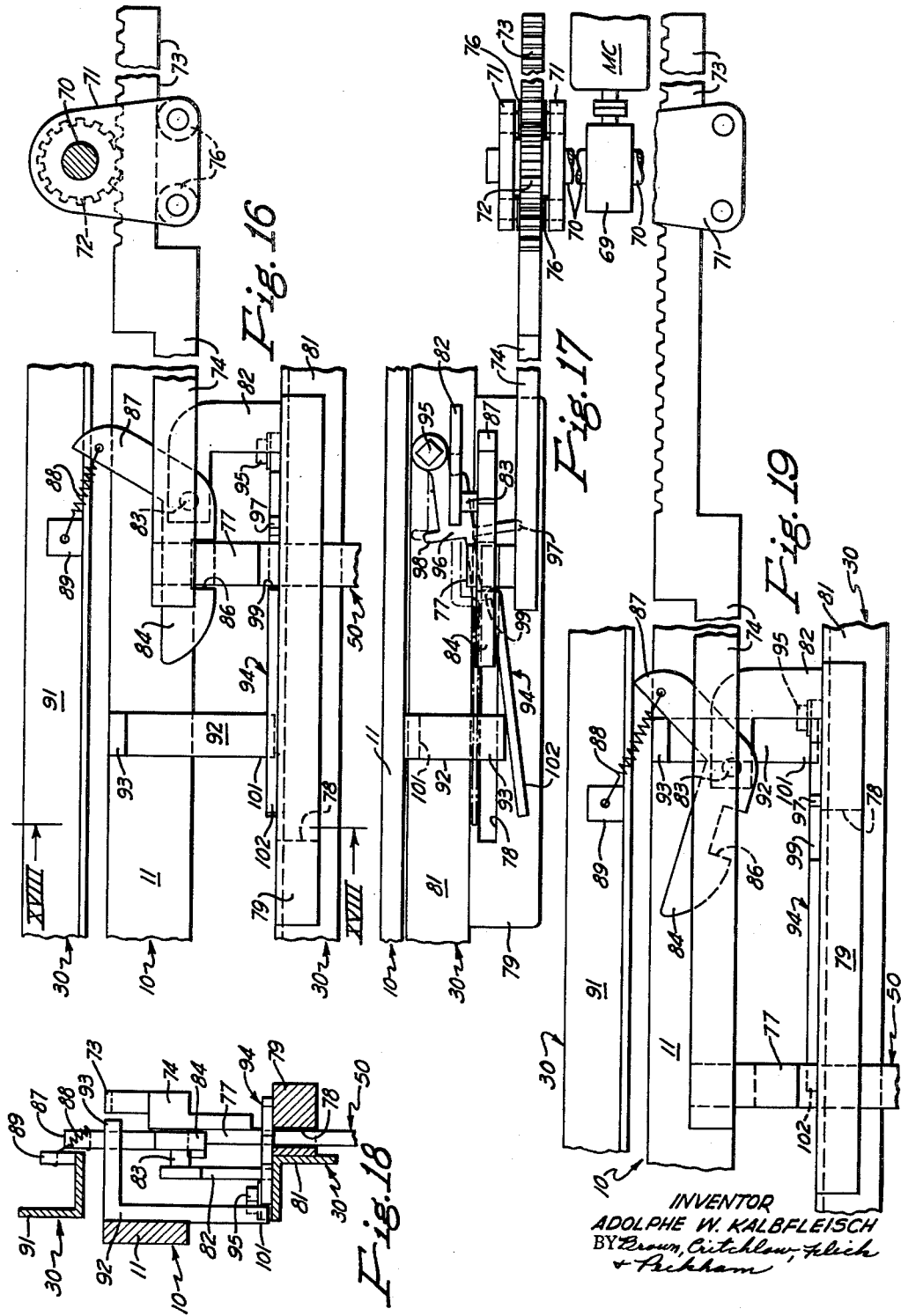

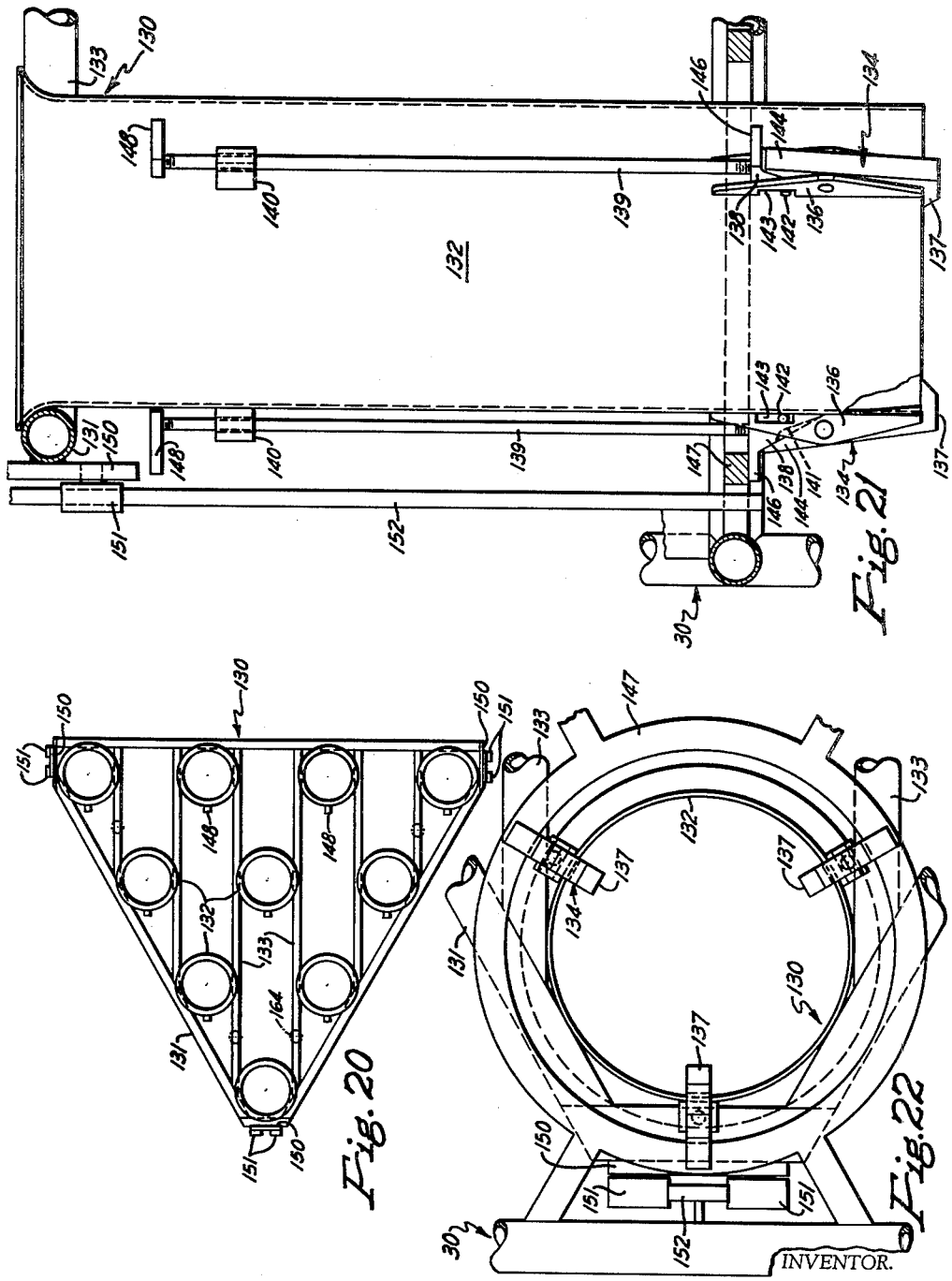

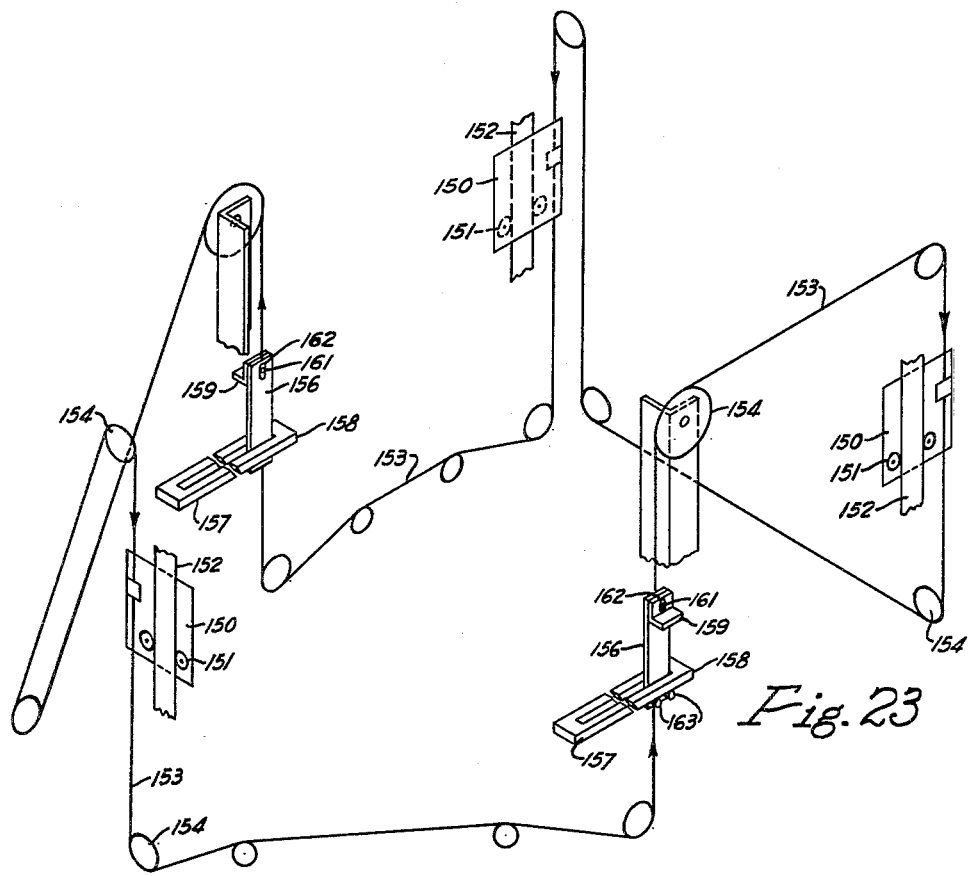
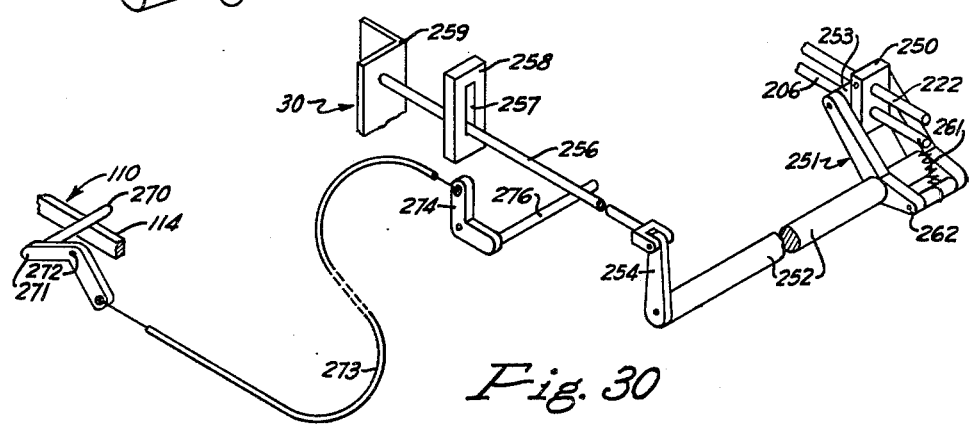

INVENTOR.
ADOLPHE W. KALBFLEISCH

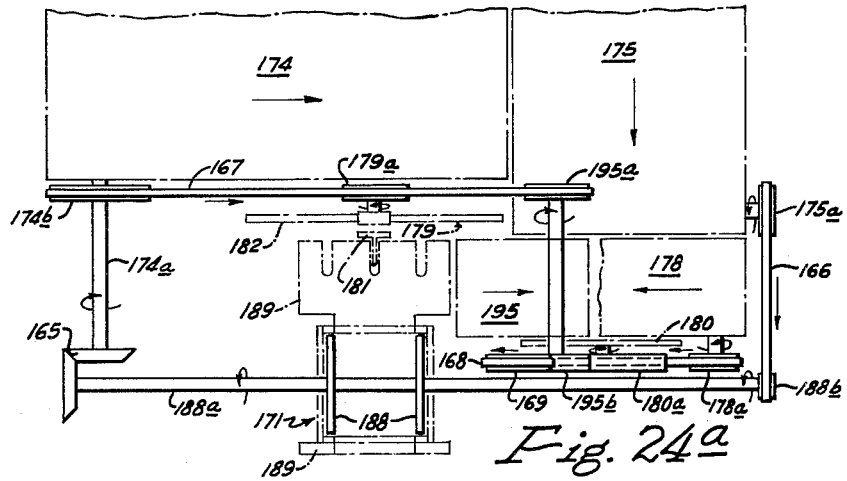

Aug. 7, 1962 A. W. KALBFLEISCH 3,048,398
BOWLING PIN HANDLING MACHINE
Filed Jan. 9, 1959 17 Sheets-Sheet 15

INVENTOR.
ADOLPHE W. KALBFLEISCH
BY Crown, Critchlow,
Flick & Peckham

ATTORNEYS

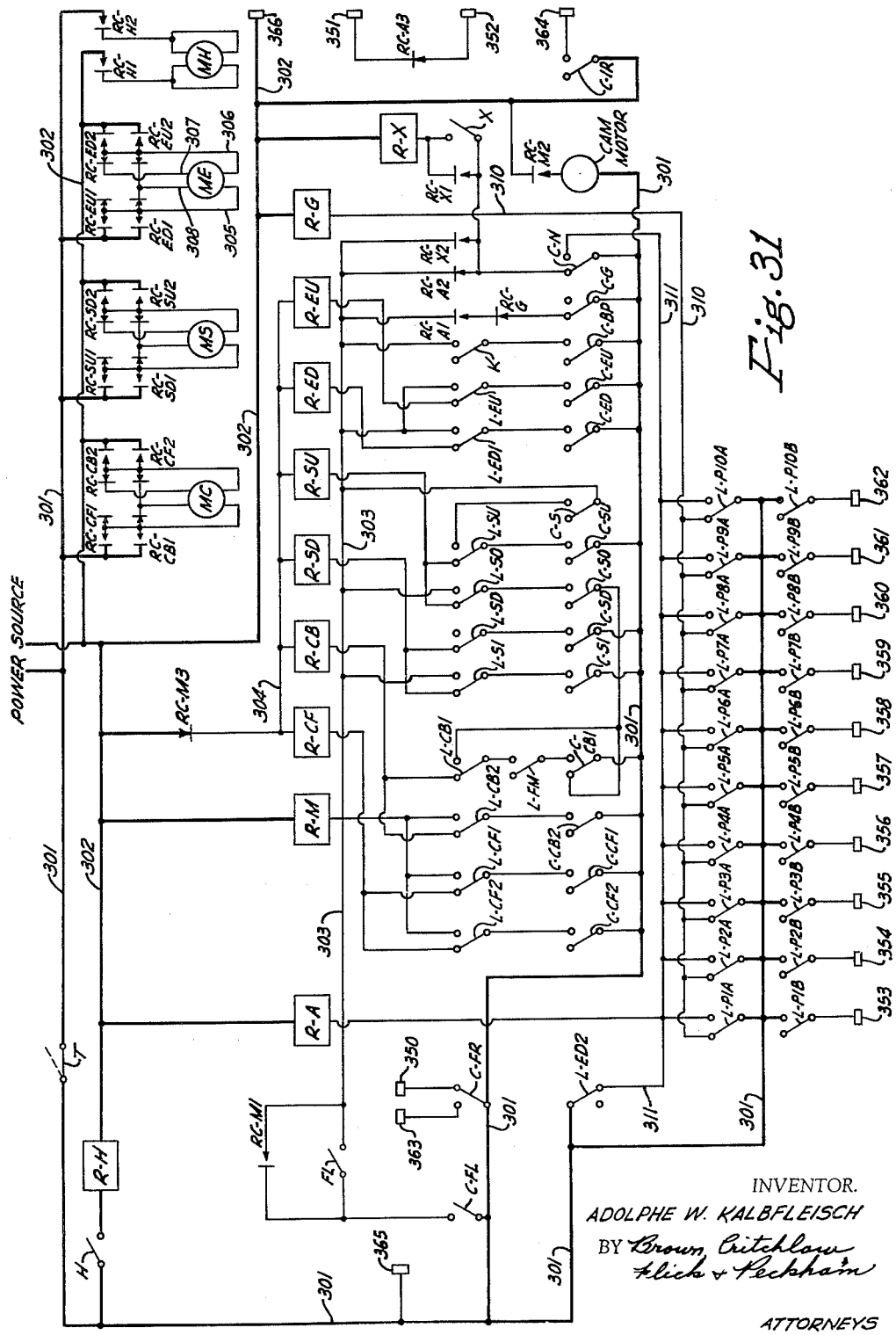

| CAM POS. | | | | 1 | 2 | 3 | 4 | 5 | 6 | 7 | 8 | 9 | 10 | 11 | 12 | 13 | 14 | 15 | 16 | 17 | 18 | 19 | | |
|---|---|---|---|---|---|---|---|---|---|---|---|---|---|---|---|---|---|---|---|---|---|---|---|---|
| ELEVATOR | UP | 0 | 1 | | | | X | | | | | X | | X | | | | | | X | | | | C-EU |
| | DOWN | 0 | 1 | | X | | | | X | | | | | X | | | | | | | X | | | C-ED |
| MAIN CARRIAGE | FORWARD | 0 | 1 | | | | | | | | | | | | | | | | | | | X | | C-CF1 |
| | BACK | 0 | 1 | | | | | | | | | | | | | | X | | | | | | | C-CB1 |
| PIN LIFTING CARRIAGE | FORWARD | 0 | 1 | | | | X | | | | | | | | | | | | | | | | | C-CF2 |
| | BACK | 0 | 1 | | | | | | | | | X | | | | | | | | | | | | C-CB2 |
| SWEEP | UP | 0 | 1 | | | | | | | | | | X | | | | | X | | X | | | | C-SU |
| | DOWN | 0 | 1 | | X | | | | | | | X | | | | | X | | | | | | | C-SD |
| | IN | 0 | 1 | | | | | X | | | | | | | | X | | | | | | | | C-SI |
| | OUT | 0 | 1 | | | | | | | X | | | | | | | | | | | | | | C-SO |
| CYCLE | STRIKE | 1 | 1 | | | | | | | | | | | | | | X | | | X | X | | | C-N |
| | GUTTER | 1 | 0 | | | | | | | | | X | | | | | | | | X | X | | | C-G |
| | FLIPPER | 0 | 1 | X | | | | | | | X | | | | | | | | | | | | | C-FL |
| MISCELLANEOUS | OFF | 0 | 1 | | | | | | | | | | | | | | | X | | | | | | C-S |
| | OFF | 0 | 1 | | | | | | | | | | | | | | | | X | X | | | | C-BP |
| | IND | 1 | 1 | | | X | | | | | | | | | | | | | | | | | | C-FR |
| | IND | 0 | 1 | X | | | | | | | | | X | | | | | | | | | | | C-IR |
| AFFECTED PART OR FUNCTION | ACTION | CONTACT-N.C. | CONTACT-N.O. | FIRST BALL | | | | | | | | | SECOND BALL | | | | | | OFF | SET PINS | | | CODE |

Fig. 32

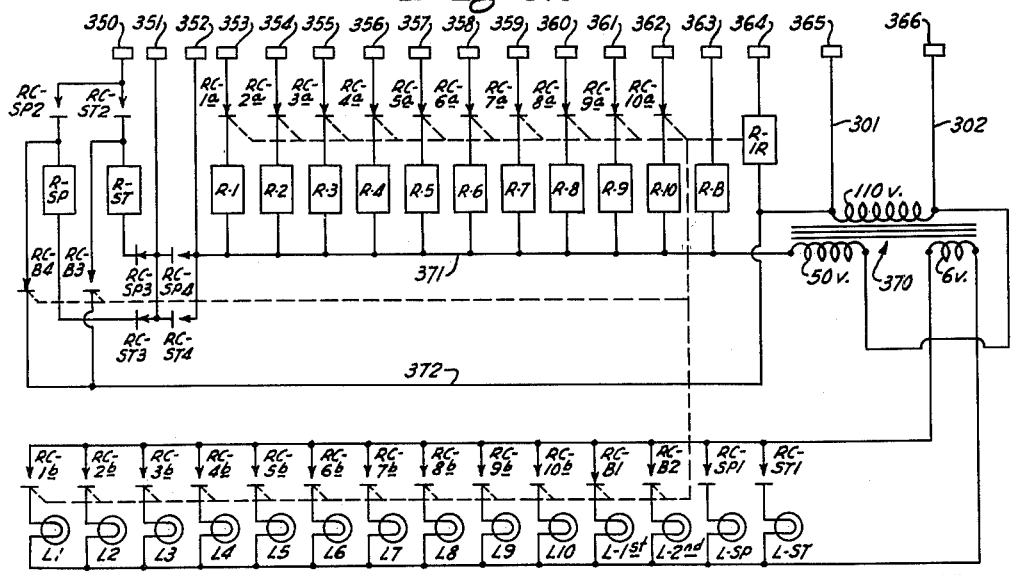

Fig. 33

INVENTOR.
ADOLPHE W. KALBFLEISCH
BY Brown, Critchlow, Flick & Peckham
ATTORNEYS

United States Patent Office
3,048,398
Patented Aug. 7, 1962

3,048,398
BOWLING PIN HANDLING MACHINE
Adolphe W. Kalbfleisch, Jeannette, Pa., assignor to Duff
Devices, Inc., Irwin, Pa., a corporation of Pennsylvania
Filed Jan. 9, 1959, Ser. No. 785,844
16 Claims. (Cl. 273—43)

This invention relates to a pin handling machine for bowling alleys. Among its primary objects are the provisions of mechanical, and substantially automatic, means to remove pins knocked down and reset pins left standing in their previous on or off-spot positions following a first ball, remove all pins and set new pins in their spot or play positions following a second ball or following the knockdown of all pins after a first ball, and return balls used in play.

The invention is particularly adapted to handle both duck pins and standard bowling pins. Duck pins are shorter than standard pins, and their bodies are provided with a projecting band of resilient material. In bowling, it is not uncommon after one or more, but less than all, pins are knocked down following a first ball to have a pin leaning against one or more fallen pins, and playing rules generally provide that a leaning pin (a pin is not regarded as fallen so long as its side, which includes the band of a duck pin, does not touch the alley) should be reset by swinging it to an upright position without displacing the point of contact between the base of the pin and the alley. Generally, leaning pins are disposed more or less crosswise of the alley. It is another and primary object of this invention to provide a machine that will reset such leaning pins in accordance with such rules.

Figure 13:
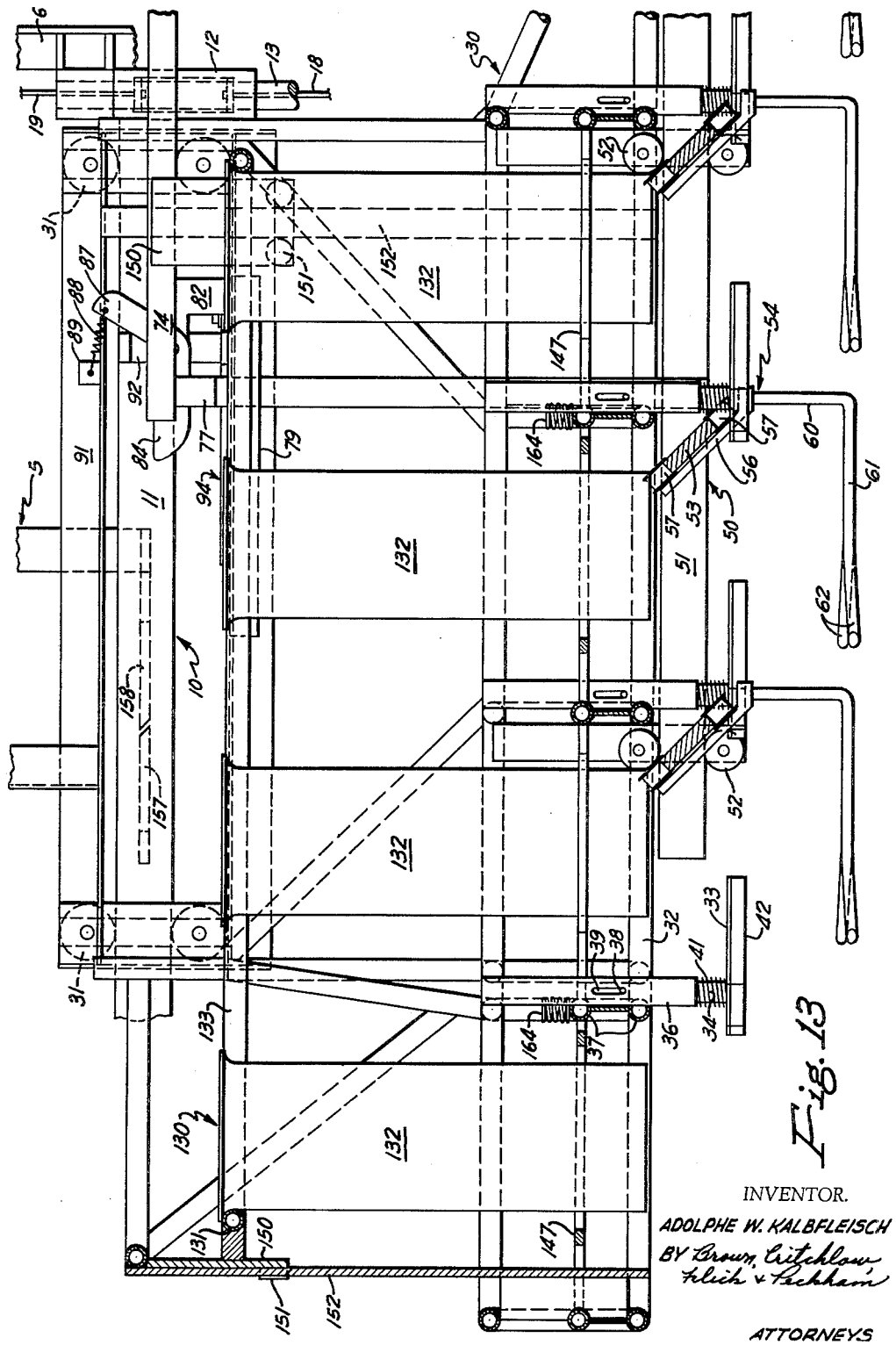
Figure 24:
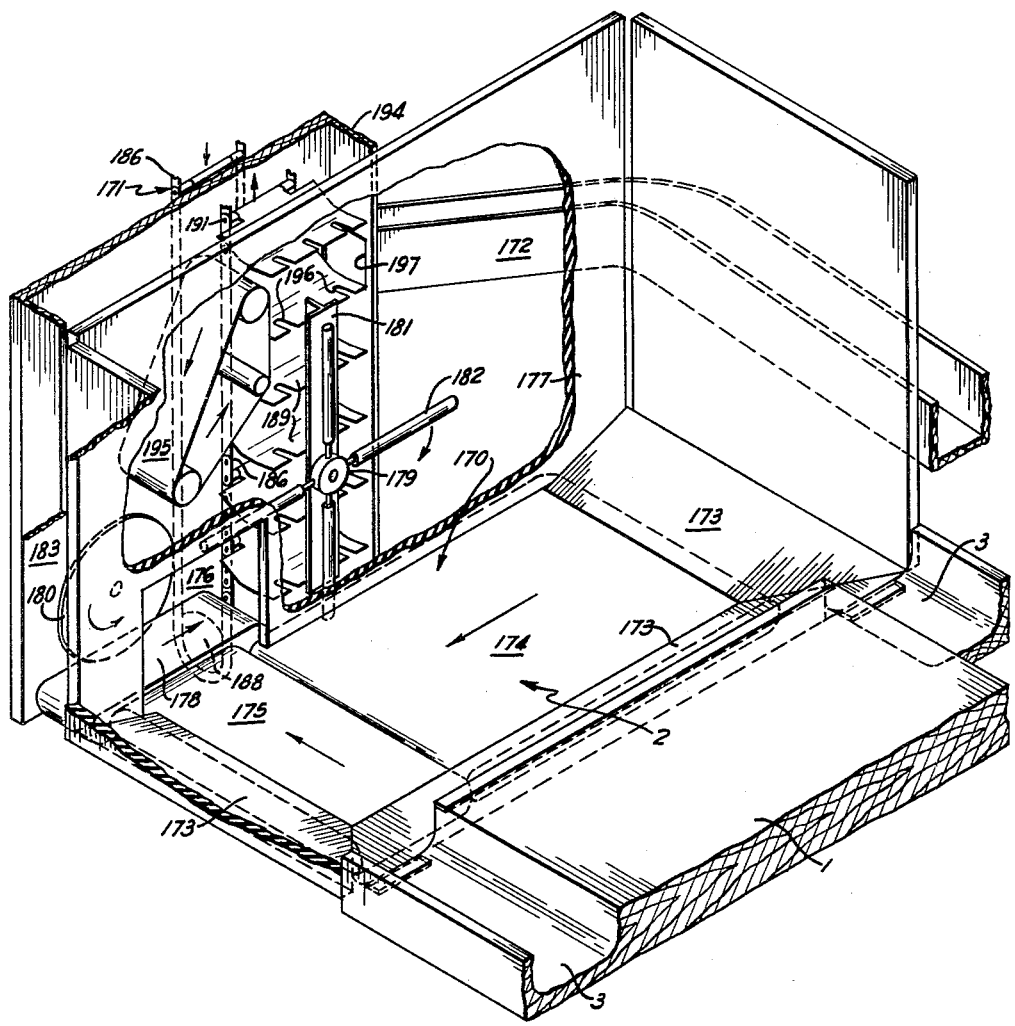
Figure 25:
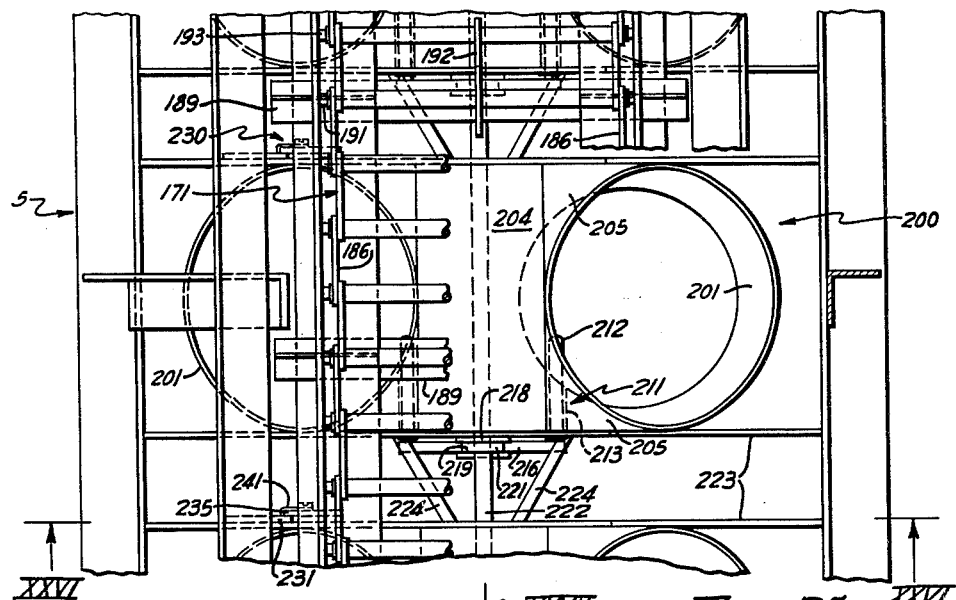
Figure 26:
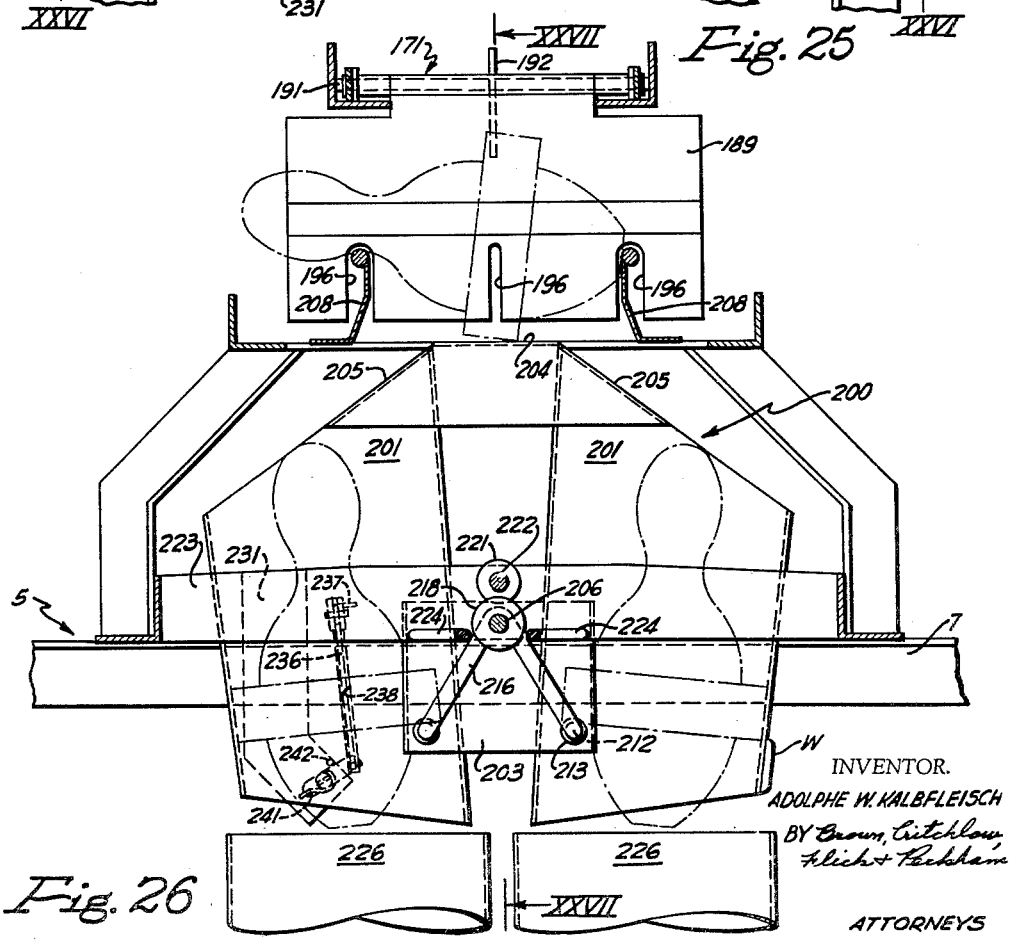
Figure 27:
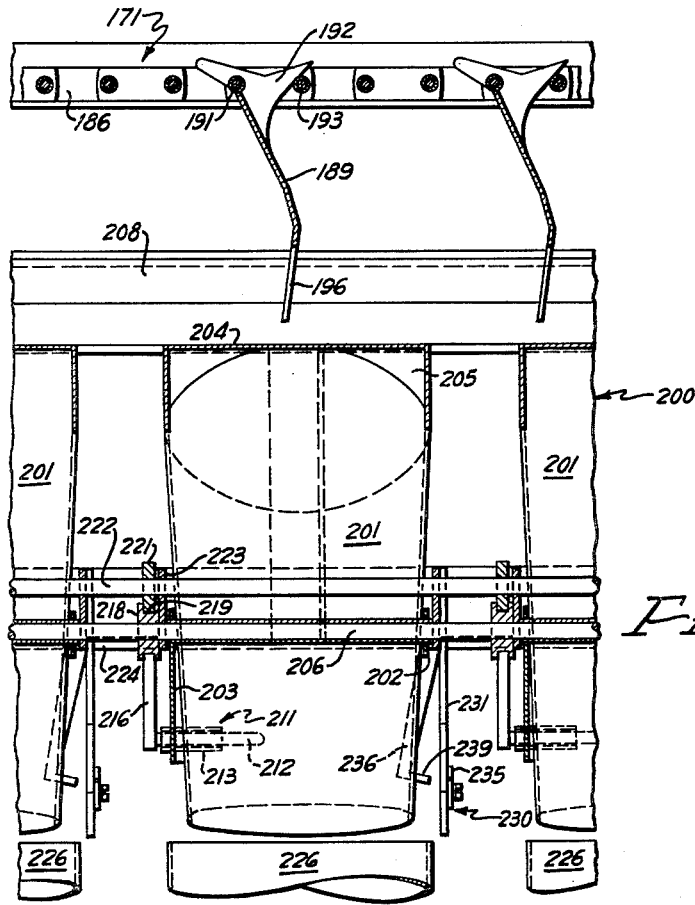
Figure 28:
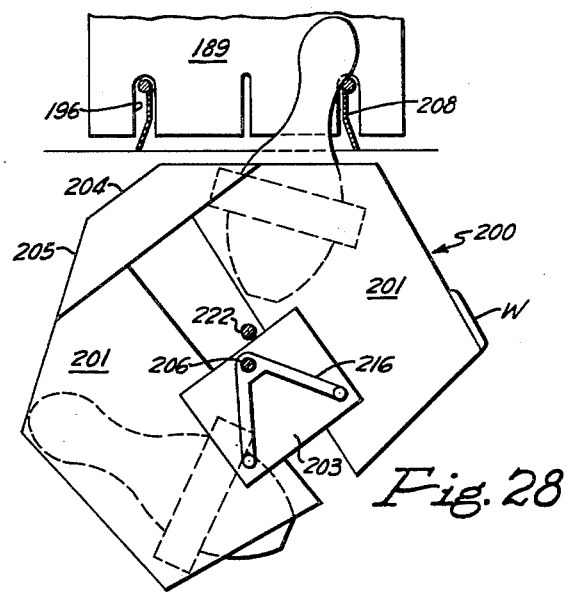
Figure 29:
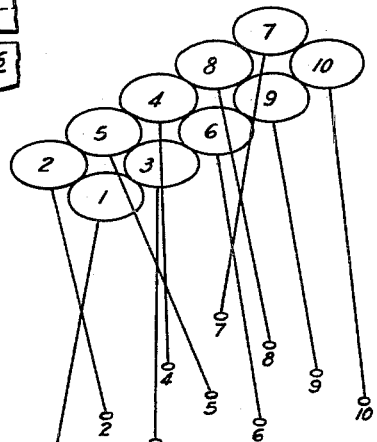

Still further objects will be apparent from the following description of the machine and the accompanying drawings, wherein:

FIG. 1 is a side elevation of the assembled machine;
FIG. 2 is a front elevation of the assembly of FIG. 1;
FIG. 3 is a rear elevation of the frame of the machine;
FIG. 4 is a plan view of the frame of FIG. 3;
FIG. 5 is an enlarged side elevation of a portion of the machine, showing the elevator, main carriage, and pin lifting carriage;
FIG. 6 is a partial rear elevation of the view shown in FIG. 5;
FIG. 7 is a plan view of the pin lifting carriage;
FIG. 8 is an enlarged side elevation, partly in section, of a portion of the main and pin lifting carriages with the latter in its pin lifting position;
FIG. 9 is a plan view of a portion of FIG. 8;
FIG. 10 is a front elevation, showing the pin lifting fingers erecting a leaning pin;
FIG. 11 is a plan view of a portion of the main and pin lifting carriages, showing means for centering the pin lifters;
FIG. 12 is a plan view of a sub-assembly of the main and pin lifting carriages;
FIG. 13 is an enlarged vertical section taken generally along the center line of the elevator and the main and pin lifting carriages;
FIG. 14 is a schematic view of the cable suspension and actuating means for raising and lowering the elevator;
FIG. 15 is a schematic view of the cable actuating means for operating the sweep;
FIG. 16 is an enlarged portion of FIG. 13, illustrating the means for reciprocating the main and pin lifting carriages, which are shown in their back positions;
FIG. 17 is a plan view of the detail shown in FIG. 16;
FIG. 18 is a vertical section along the line XVIII—XVIII of FIG. 16;
FIG. 19 is similar to FIG. 16, but with the main and pin lifting carriages in their extreme forward positions;
FIG. 20 is a plan view of the pin setting carriage for setting a complement of ten bowling pins on the alley;
FIG. 21 is a side elevation of a portion of the pin setting carriage, showing a pin setting tube and means for releasably securing a bowling pin therein;
FIG. 22 is a bottom view of that portion of the apparatus shown in FIG. 21;
FIG. 23 is a schematic view of the means for suspending the pin setting carriage within the main carriage and of the means for locking and unlocking those two carriages for conjoint and relative vertical movement;
FIG. 24 is an isometric view of the pit conveyor and of the vertical pin and ball hoist conveyor for removing pins and balls from the pit;
FIG. 24a is a diagrammatic plan view of the interconnected drive means for the pit conveyors and the hoist conveyor and the associated driven elements shown in FIG. 24;
FIG. 24b is a diagrammatic rear elevation of the drive means of FIG. 24a;
FIG. 25 is a plan view of a portion of the pin storage magazine and of the horizontal reach of the pin conveyor hoist, a portion of the latter being deleted to give a clear view of one of the pin storage units;
FIG. 26 is a vertical section along the line XXVI—XXVI of FIG. 25;
FIG. 27 is a vertical section taken along the line XXVII—XXVII of FIG. 26;
FIG. 28 is a somewhat diagrammatic view, similar to FIG. 26, showing one pin storage unit receiving a second pin from the pin conveyor;
FIG. 29 is a schematic view of the pin chutes for delivering pins from the pin storage magazine to the pin setting tubes;
FIG. 30 is an isometric view of the release means for discharging pins from the pin storage pockets;
FIG. 31 is a schematic wiring diagram of the electrical circuit for operating the apparatus;
FIG. 32 is a chart showing the sequences of operation of the apparatus; and
FIG. 33 is a schematic wiring diagram of the indicator panel showing the status of play at any given time during a bowling game.

The bowling pin apparatus of the present invention includes generally pin setting and resetting devices, pin gathering and conveying means, pin storage means, and an electrical control circuit. The invention will be described in connection with the handling of duck pins; but it will be understood that, except for dimensional changes, it is equally applicable to the handling of standard pins and other types of pins.

*Pin Setting and Resetting Devices*

In the drawings, numeral 1 designates the pin receiving portion of a bowling alley, the latter terminating in a pit 2 for receiving pins removed from the alley. On each side of the alley are ball gutters 3 and kick backs or sides 4. A main frame 5 spans the alley and is rigidly mounted on the upper edges of the sides 4. This frame includes upright members 6, cross members 7, and top members 8 (see FIGS. 1–4); it supports the pin setting and resetting devices and the pin storage magazine.

*The elevator.*—(See FIGS. 1, 2, and 5.) Suspended by cables within the frame is an elevator 10, comprising side bars 11 disposed on each side of the frame and secured at their ends to sleeves 12. These sleeves are slidably mounted on vertically extending guide rods 13 secured to the upright frame members 6. The elevator has two positions: a top position (shown in FIG. 1), in which the pin handling devices supported by the elevator do not interfere with play, and a bottom position (shown in FIG. 5), in which these same devices are operative to sense the presence of standing and leaning pins, pick up standing and leaning pins, whether on or off their regular spot positions, reset previously standing and leaning pins in their previous on or off-spot positions, or set new pins in their regular on-spot positions.

The cable suspension for raising and lowering elevator 10 is shown schematically in FIG. 14. The front ends of side bars 11 are supported by one pair of cables 16 and 17, the back end by a similar pair 18 and 19, each pair forming, in effect, an endless cable secured to the side bars. The cables pass around various sheaves 21 attached to the main frame, and a portion of each cable, intermediate its ends, is wrapped around a common windlass rod 22, which is driven by a reversible electric motor ME through a gear reduction 24. It will be apparent from the drawing, without further description, that the elevator will be raised when the windlass 22 turns in a counter-clockwise direction (viewed from the left) and will be lowered when the windlass is turned in the opposite direction. To limit the load on the driving motor, the weight of the elevator and of the devices supported by it is substantially balanced by counterweights 25, which are supported by cables 26 passing over sheaves 27 on the main frame and around sheaves 28 on the elevator.

*The main carriage.*—(See FIGS. 1, 2, 5–6, 8, 12–13, and 16–19). A main carriage 30 is suspended on rollers 31 from the side bars 11 of the elevator 10 and by means described below, is movable longitudinally of the alley into a forward or back position (right and left, respectively, in FIG. 1 and left and right, respectively, in FIGS. 5, 13, and 16–19). This carriage includes a depending frame portion 32, beneath which ten pin clamping pads 33 are mounted on rods 34 slidably received within sleeves 36, the latter being attached to cross bars 37 of the carriage. Each pad 33 is permitted limited vertical reciprocation, and prevented from rotating, by a pin 38 projecting from the side of its supporting rod 34 into a slot 39 in the wall of the sleeve 36 (see FIG. 8). Each pad is yieldably held in its downward position by a coil spring 41 extending between the top of the pad and its supporting sleeve. In addition, the bottom of each pad is preferably provided with a layer of resilient material 42 to cushion the shock of contact with the head of a standing pin. When the elevator is lowered, each pad resiliently engages the head of any standing or leaning pin immediately below it and clamps the pin under the pressure of springs 41 to the bed of the alley. The pads are triangularly disposed (see FIG. 12), so that the axes of their supporting sleeves 36 will be directly above the regular pin spots when the main carriage is in its forward position. Each pad has a broad front and a tapering rear end (such as the exemplary shape shown in FIG. 12), which observation has shown will enable the pad to clamp leaning or standing pins that are displaced from their on-spot positions during normal play.

*The pin lifting carriage.*—(FIGS. 1, 2, 5, 7–11, 13 and 16–19). A pin lifting or resetting carriage 50 includes a pair of side rails 51 supported by rollers 52 mounted on the main carriage 30, so that the pin lifting carriage may be moved longitudinally of the alley into a forward or back position relative to and beneath the main carriage 30. The pin lifting carriage also includes four horizontal cross rails 53 of rectangular cross section, preferably tilted at an angle of about 45°. Ten pin lifters 54 are slidably supported on these cross rails by brackets 56, which ride the rails on flanged rollers 57. These pin lifters are disposed in a triangular array with from one to four pin lifters on each cross rail, as shown in FIG. 7. Each pin lifter includes a pair of lifting fingers 60, having spaced parallel portions 61 forming a throat, and diverging end portions 62. These diverging portions are bent vertically in opposite directions, as shown in FIGS. 5, 8, and 13, to permit pin lifters supported on the same cross rail to overlap to some degree without interference. The throat of each pin lifter is slightly wider than a pin neck (broken line A in FIG. 9), but narrower than a pin head (broken line B in FIG. 9), so that the throat may loosely receive a pin neck and then lift the pin by its head.

When the elevator 10 is lowered with the main carriage 30 in its forward pin-clamping position, the pin lifting carriage 50 is initially in its back position, so that each pin lifter will be behind an adjacent clamping pad 33 and any on or off-spot standing or leaning pin clamped thereunder. By means to be described later, whenever the pin lifting carriage is returned to this back position, each pin lifter is centered directly behind the midpoint of its adjacent clamping pad (i.e., directly behind a pin spot). When a resetting operation is called for after a partial knockdown of pins on the first ball, the elevator goes down (main carriage forward, pin lifting carriage back) to clamp one or more standing or leaning pins; then the pin lifting carriage moves forward to its front position and any on-spot clamped pin will be received directly in the throat of the adjacent pin lifter. If the pin is clamped in an off-spot position, its neck will contact the inner side of one or the other of the diverging portions 62 of fingers 60 and, since the pin is clamped, will center the advancing pin lifter by shifting it on its cross rail, on which it is readily movable, until the neck of the pin is received within the throat. When the elevator is then raised (the pin lifting carriage remaining in its forward position) to permit fallen pins to be swept from the alley, the clamping pads release the standing or leaning pins before the pins are lifted from the alley. To assure that this will happen, the vertical travel of the pin lifters between their bottom, pin neck-receiving position (elevator down) and their initial pin lifting positions (elevator rising and the fingers starting to engage the heads of standing pins) is made greater than the vertical travel of the clamping pad rods 34 in their sleeves 36. This vertical travel of the pin lifters can be adjusted by varying the vertical distance between the pin lifting fingers 60 and the pads 33, by sliding the pin lifters 54 upward or downward in hole in brackets 56 and securing them in the desired position by set screws 63. FIG. 8 shows a pin lifter in its initial pin lifting position engaging the head of a pin; with the clamping pad 33 already disengaged from the head of the pin.

The features explained in the preceding paragraph permit the resetting of leaning pins in accordance with playing rules previously stated. FIG. 10 shows a leaning pin 64 supported by a fallen pin 65 and clamped in its leaning position by one of the pads 33 (not shown). As the pin lifting carriage is advanced, a diverging finger 62 of a pin lifter 54 contacts the neck of the leaning pin; and the further advance of the pin lifting carriage 50 causes the pin lifter to center itself as previously described and to receive the neck of the leaning pin in the throat between fingers 60. When elevator 10 rises, the pad 33 releases the head of the leaning pin before the fingers lift it. Then, as the rising fingers come into lifting engagement with the pin head, their tendency to drag the base of the pin over the alley until the pin is in an erect position below the fingers is opposed by the friction between the base of the pin and the alley, the latter being sufficient to move the pin lifter to the right on its cross rail, thereby tilting the pin into an erect position, as shown by the broken lines in FIG. 10, without displacing its point of contact with the alley. This operation would not be possible if the clamping pads did not release the head of the pin before it was lifted by the fingers, since the pin would then be clamped between the pad and the fingers, locking the pin lifter on its cross rail.

When the elevator is in its top position with the pins lifted from the alley, a sweep (to be described below) removes fallen pins from the alley and gutter, discharging them into the pit 2. The elevator is then lowered, with the main and lifting carriages still in their forward positions, and the lifted pins are set down on the alley in their previous on or off-spot positions (leaning pins being reset in their erected positions). The reset pins are then clamped to the alley by the pads 33, while the pin lifting carriage is moved to its back position to completely disengage the pin lifters from the pins and to recenter the pin lifters for the next operation. The elevator is then raised to its top position and play resumes.

By inclining the cross rails 53 on the pin lifting carriage and by mounting the pin lifters thereon as shown in FIG. 8, a pin lifter is effectively locked on its cross rail after lifting a pin from the alley. This locking feature results from the increased friction between the flanged rollers 57 and the cross rail 53 on which they ride as a result of the leverage exerted by the full weight of a lifted pin supported in the throat of the pin lifter. In other words, the construction shown permits the pin lifters not only to hunt on and off-spot standing and leaning pins and center themselves about the necks of those pins; but also, once the pins are lifted, to hold them in the desired position until they are reset.

FIG. 11 shows a means for centering each of the pin lifters 54 directly behind a pin spot whenever the pin lifting carriage 50 is moved to its back position relative to the main carriage 30 after each resetting operation. Crossed flexible cables 66 and 67 have one of their ends secured to the pin lifter bracket 57 and their other ends secured to a forwardly adjacent cross member 37 on the main carriage. The cables are of such length that when the pin lifting carriage is moved to its back position the cables will tighten and center the pin lifter. When the pin lifting carriage moves forward during a resetting operation, the cables are slackened so as not to interfere with the lateral freedom of movement of the pin lifter on its cross rail within its desired limits of travel.

The main carriage and the pin lifting carriage (see FIGS. 16–19) are both driven by the same reversible electric motor MC, which is mounted on a rear cross member of the elevator 10. The motor drives a gear reducer 69 which has a shaft 70 extending on either side of the gear reducer and is supported at its outer ends by a bearing bracket 71 mounted on the elevator. Adjacent each end of this shaft is secured a pinion gear 72, each pinion engaging a separate rack 73 on a portion of a rack bar 74, which extends along the side of the machine and is supported on rollers 76 mounted on the bracket 71. The forward end of each rack bar 74 is attached to the upper end of a post 77 that is part of the pin lifting carriage. Accordingly, the forward and back reciprocations of the rack bars on each side of the machine will result in a similar reciprocation of the pin lifting carriage.

The pin lifting carriage 50 is locked to the main carriage 30 when the latter is reciprocated between its front and back positions. Each of the posts 77 passes through a longitudinally extending slot 78 in a guide member 79 attached to one of the side frame members 81 of the main carriage 30. Mounted on the frame member 81 is a latch support 82, on which is mounted a pin 83, pivotally supporting a latch 84 having a downwardly extending notch 86 adapted to receive and lock onto the top end of post 77. Latch 84 also has an upwardly extending trip portion 87, and the latch is urged into locking engagement with the top of post 77 by a spring 88 extending between the rear end of the latch and a spring support 89 on an upper side frame member 91 of the main carriage.

In order that the pin lifting carriage may move forward relative to the main carriage after the elevator is lowered (with the main carriage in its forward position) to lift and reset standing pins on the alley, an inverted, L-shaped latch release bracket 92 is mounted on the inside of each elevator side rail 11. The top horizontal portion 93 of this bracket is adapted to engage the front, inclined edge of the trip portion 87 of latch 84 and to release the latch from post 77 when the pin lifting carriage is urged forward with the main carriage in its extreme front position. As the pin lifting carriage moves forward, post 77 advances in the slot 78 of guide member 79 on the main carriage. When the pin lifting carriage is then retracted to its back position relative to the main carriage, rearward movement of the latter is prevented by a second latch means that locks the main carriage to the elevator. This second latch means is provided by a horizontal lever 94, one of which is pivoted on each of the frame members 81 on either side of the main carriage by a pivot pin 95. Lever 94 has an irregular shape as shown in FIG. 17. A cross piece 96 near the pivoted end of the lever is provided with projecting end portions 97 and 98. The former cooperates with reverse bend portion 99 in the lever for engagement with post 77 extending up from the pin lifting carriage. When the two carriages are locked together by latch 84, as shown in FIGS. 16 and 17 with the main carriage in its front position, further advancement of the pin lifting carriage first unlocks latch 84, as previously explained. Continued advancement of the pin lifting carriage results in forward movement of that carriage relative to the main carriage, which remains stationary. Post 77 then strikes the reverse bend portion 99 of lever 94, swinging it on its pivot 95 to occupy the broken line position shown in FIG. 17, so that the lower end 101 of release bracket 92 on the elevator rail 11 will be locked behind the lever 94 between the pivot 95 and the projecting end 98 of that lever. The main carriage is thereby locked to the elevator; and it remains locked until the pin lifting carriage returns to its back position, since post 77 in moving forwards and backwards in slot 78 continually bears against the free end 102 of lever 94 and maintains that lever in the broken line, locking position shown in FIGS. 17 and 19.

When the pin lifting carriage is returned to its back position relative to the main carriage, post 77 strikes the forward curved edge of latch 84 (held in its elevated position by arm 93 on release bracket 92). Further rearward movement causes post 77 to engage projecting arm 97 of lever 94 and to unlock that lever from the lower end 101 of bracket 92, so that the lever reverts to the position shown in solid lines in FIG. 17. At the same time, the back of post 77 engages the back of notch 86, and the two carriages are again locked together and are unlocked from the elevator rails, so that they can again move in unison between the forward and back positions of the main carriage.

The use of the rack and locking devices described above on each side of the main carriage 30 assures smooth and even translation of the main and pin lifting carriages from and to their various positions.

*The sweep.*—(See FIGS. 1 and 15.) A sweep 110 is mounted on a projecting frame 111 attached to the main frame 5. This projecting frame includes a channel member 112, of which the front portion 113 is curved upward through a short arc of about 90°, while the rest of the channels extends longitudinally on each side of the main frame. The sweep includes two side arms 114, connected at their outer ends by a sweep bar 115 extending across the alley and gutters. The inner end of each side arm is connected to or adjacent to one end of a link 117 and held at a fixed angle thereto by a brace 118. One end of link 117 is pivotally connected to the end of a link 119. Rollers 121 and 122 are rotatably mounted on link 117, and a roller 123 is similarly mounted on link 119 near its free end. These rollers are received within the channel members 112 and 113, so that the sweep is movable backwards and forwards in the channel members by cables, as described below. In its forward position, shown in FIG. 1, the sweep is elevated by its linkage and the curved portion of the channel, so that it does not interfere with play. In its guard position, the sweep arms 114 are substantially perpendicular to the alley bed, and the sweep bar 115 extends across the alley immediately in front of the pin receiving portion or pin deck. In this latter position, the links 117 and 119 are on a straight line and the three rollers 121–123 are received within the straight channel portions. The guard position is assumed by the sweep whenever the elevator 10 is lowered, thereby protecting the setting and resetting devices against damage from a ball inadvertently rolled down the alley. To sweep the alley and gutters free of pins, the sweep is moved from its guard position to the rear of its supporting channel members (elevator 10 being in its top position). During this movement, the sweep bar 115 moves parallel to and just above the surface of the alley and sweeps all pins (and balls) left in the playing area into the pit 2, the bottom edge of the sweep bar being contoured to sweep the gutters as well. The sweep is then returned to its guard position and kept there until new pins have been set or lifted pins reset on the alley. After the elevator again returns to its top position, the sweep goes back to its normal position shown in FIG. 1.

FIG. 15 shows diagrammatically the cable connections to the sweep 110, for moving the latter along the channel members 112. The cable 124 is an endless one, attached at two opposite points to the ends 126 of links 119 on each side of the sweep. Between these two points, the cable passes over various sheaves 127 and around a windlass drum 128, driven by a reversible electric motor MS through a reduction gear 129. When the drum rotates, the sweep is moved forward or back in its supporting channel members and may be stopped at its intermediate guard position.

*Pin setting carriage.*—(See FIGS. 1, 13, 20–23.) The pin setting carriage 130 includes a horizontally disposed triangular frame 131 suspended by cables for vertical reciprocation inside the framework of the main carriage 30, as more fully explained below. Ten pin setting tubes 132 are secured to and depend from the frame and from longitudinal bars 133 spanning the frame. Each tube is adapted to hold a pin received from one of the storage pockets in the upper part of the main frame and, as explained below, to deposit the pin on the alley whenever a new set of pins is called for during the progress of a game.

Each setting tube is provided with three spaced pin holding latches 134 (not shown in FIG. 13), pivotally mounted in brackets 136, which are attached to the outside of the tube near the bottom. These latches are L-shaped, with a finger 137 extending radially inward below the bottom of the tube to engage the band of a duck pin, or the side of a standard pin, inside the tube, so that the bottom of the pin in either case will project below the tube and latches. The latches are urged into their open or pin releasing positions by wire springs (not shown). They are moved to their latching positions and locked there by wedged-shaped cams 138 attached to the lower ends of vertical rods 139, which are slidably received in brackets 140 secured to the sides of the tube. Preferably, the cams 138 have a curved outer face 141 to provide a sharpened tip. Each cam is slidably secured for limited vertical travel in bracket 136 by means of a pin 142 projecting laterally from the cam through a slot 143 in the side of the bracket, with the curved inclined operating face of the cam engaging a tapered upper portion 144 of the latch. Movement of the cams is controlled by vertical movement of the pin setting carriage. When that carriage approaches its top position relative to the main carriage after setting a complement of new pins, a laterally extending dog 146 on each cam is brought into engagement with the under surface of a ring 147 mounted on the main carriage (see FIGS. 12 and 21) and concentric with setting tube 132, so that further upward movement of the tube setting carriage to its top position forces the cams into locking position. They remain in that position until the tube setting carriage is lowered to set another set of pins. A dog 148 on the top of each rod 139 is then brought into engagement with the upper surface of ring 147, as the pin setting carriage approaches its extreme bottom position relative to the main carriage. Slight further downward movement of that carriage into its bottom position forces the cams upward and permits the latches to open under spring pressure to release the pins in the tubes.

The pin setting carriage is locked to the main carriage for vertical movement therewith, so long as the main carriage is in its forward position, where the clamping pads 33 are directly over the pin spots on the alley. However, when the main carriage is in its back pin setting position, a position to which it is moved after a strike or at the end of a frame of bowling, the pin setting tubes are directly over the pin spots and the pin setting carriage moves downward with the main carriage, but at a faster rate and over a greater distance for substantially all of its fall, and in its bottom position the pin setting tubes extend below the clamping pads 33 and the pin lifters 54, so that the pins projecting from the ends of the setting tubes will rest on the bed of the alley on their proper spots when the latches holding the pins in those tubes are released.

The foregoing movements of the pin setting carriage are determined by its suspension in the main carriage. This is shown somewhat diagrammatically in FIG. 23. To each corner of the pin setting carriage is attached a vertically disposed plate 150 (see FIGS. 20–23), provided with spaced guide rollers 151 adapted to embrace a vertically extending guide rod 152 secured to the frame of the main carriage. The pin setting carriage is suspended inside the main carriage by an endless cable 153 attached at fixed points to the corner plates 150 and looping over and under sheaves 154, rotatably supported on the main carriage frame.

Vertically extending stop members or bars 156 are secured to the cable at opposite points on either side of the pin setting carriage. When the main carriage is in its forward position, these stop bars are slidably received within slotted lock members 157 attached to the side rails 11 of the elevator 10. When the main carriage is in its back, pin-setting position (the position shown in FIG. 23) the stop bars are received within similar lock members 158 attached to the main frame 5. The two pairs of lock members 157 and 158 are in aligned registration when the elevator 10 is in its top position (see FIG. 13). A laterally projecting flange 159 is adjustably secured by a screw 161 extending through a slot 162 to the top of each stop bar 156. A pair of spaced rollers 163 are rotatably secured to the bottom of each bar. The flange and rollers limit the vertical travel of the stop bars in the slotted lock members 157 and 158, the rollers 163 also facilitating the sliding transfer of the stop bars from one slotted lock member to the other. Since the weight of the pin setting carriage always tends to move the cable around the various sheaves in the direction shown by the arrows in FIG. 23, the stop bars 156 tend normally to move upward and are restrained from doing so by the rollers 163 engaging the underside of the lock members in which the bars are received.

The main and pin setting carriages are locked together for conjoint horizontal movement by the guides 152 and rollers 151. As for relative vertical movement between these carriages, when the main carriage is in its forward position and the stop bars are received in the forward lock members 157, which are attached to the elevator and move up and down with the main carriage, there will be no relative vertical movement between the main carriage and the pin setting carriage, because all elements of the suspension move in unison. However, when the main carriage is in its back position and the stop bars 156 are received in the rear lock members 158, which are attached to the main frame and immovable, the lowering of the main carriage, in effect, causes the cable to move over the sheaves 154 in the direction indicated by the arrows in FIG. 23, although the cable itself is unable to move because the stop bars 156 are locked against upward movement. Since the sheaves are mounted on the main carriage, their downward movement causes the pin setting carriage to move downward relative to, and at a faster speed than, the main carriage. Such relative motion continues until the pin setting carriage is almost at its bottom position relative to the main carriage, while the latter is still some few inches from its bottom position. At this point, the pin setting carriage contacts a plurality of coil springs 164 mounted on the lower part of the main carriage. These springs support the weight of the pin setting carriage, which now moves down with, but no longer relative to, the main carriage. Its suspension cable and stop bars 156 do likewise, the latter descending in the slots of the locking members 158, which are fixed to the frame 5 and are stationary. This conjoint descent of the two carriages continues until flanges 159 on the upper ends of stop bars 156 engage the top of lock members 158 just before the elevator and main carriage reach their bottom positions and just as the bottoms of the pins in the pin setting tubes 132 touch the alley bed. The slight further downward movement (preferably less than one inch) of the main carriage to its bottom position now pulls the cable 153 around the sheaves 154 in the direction of the arrows in FIG. 23. This movement of the cable pulls the pin setting carriage downward relative to the main carriage causing the pin holding latches 134 to open and release the pins in the pin setting tubes, as previously described.

The foregoing arrangement for suspending the pin setting carriage has several advantages. It permits the carriage to occupy a normal position above the clamping pads and pin lifters, so that it will not interfere with sensing and resetting operations. Likewise, it permits the pin setting carriage to be lowered into its operative position just above the bed of the alley without any additional vertical travel of the elevator and main carriage and without any additional drive means. In addition, the fact that the pin setting carriage can occupy two horizontally displaced positions (i.e., when the main carriage is in its front and back positions) permit the clamping pads to be disposed directly above the pin spots when the main carriage is in its forward position, and permit the pin setting tubes to be positioned directly above those spots when the main carriage is in its back position. A still further advantage is that the pin setting carriage, although moving at about twice the speed of the main carriage during the first part of its descent, is moving at the same speed as that carriage when the pins touch the alley, thereby preventing damage to the pins without delaying the pin setting operation. Finally, the arrangement permits a fast, clean release of the pin-holding latches on the pin setting tubes.

*Pin Gathering and Conveying Means*

Fig. 24 shows the rear portion of the alley 1, the pit 2 into which pins and balls fall or are pushed by the sweep, the pit gathering means 170 for collecting and feeding pins and balls into the vertical hoist conveyor 171, and the lower part of that conveyor for carrying pins only to the storage pockets and balls to the ball return chute 172.

The pit is provided with sloping sides 173, so that pins or balls deposited thereon will slide or roll onto either a transverse belt conveyor 174 or a longitudinal belt conveyor 175, each conveyor moving in the direction indicated by the arrows in the drawing. Conveyor 174 feeds pins and balls transversely of the pit and somewhat past its longitudinal center line to conveyor 175. The latter feeds the pins and balls so received, as well as others deposited directly thereon or sliding thereon from the adjacent sloping side 173, through an opening 176 in a back cushion 177 to a second transverse conveyor 178, which moves in a direction opposite to that of conveyor 174 and feeds the pins and balls to the hoist conveyor 171. Conveyors 174 and 175 are so arranged relative to the opening 176 that pins cannot jam at that opening, which is wider than the length of a pin. Conveyor 178, on the other hand, is narrower than the length of a pin. To avoid pins jamming on this conveyor, and to align pins axially thereon for delivery to the hoist 171, a paddle wheel 179 is rotatably mounted on the front face of a vertically extending, T-shaped guide member 181 behind the cushion 177 and in front of the hoist 171. The four rubber covered arms 182 of this paddle wheel project behind the opening 176. In addition and for the same purpose, a revolving disc 180 is rotatably mounted on a back wall 183, adjacent the opposite side of conveyor 178. The disc and paddle, which are rotated in opposite directions as shown by the arrows, cooperate to align pins longitudinally of conveyor 178, so that pins will enter the hoist 171 either butt first or head first.

Hoist 171 includes two endless, parallel chains 186 supported on a frame 187, extending from the back of the pit to the front top of the main frame 5, and is driven by sprockets 188 (see FIGS. 1 and 24a–24b). Bucket plates 189 are pivotally mounted between the chains on transverse link pins 191 and, when moving upwards, are held substantially normal to the chains by heel plates 192 (see FIGS. 1 and 27), bearing against other transverse link pins 193 extending between the chains. The bucket plates have a slight downward inclination to the right (in FIG. 24), so that a ball received thereon will roll to the right hand side of the bucket plate. A shroud or vertical wall 194 closes the right hand side of the vertical portion of the hoist. It acts as a stop for pins and balls fed into the left hand side by conveyor 178, and as a stop for pins that are nudged more fully onto the bucket plates by the inclined surface of a fourth belt conveyor 195 mounted on the left hand side of the hoist. The front edge of each bucket plate is provided with three slots 196. The middle slot rides on the back edge of the T-shaped guide 181; and the other slots receive guide rails in the horizontal reach of the conveyor above the pin storage units, as described later herein. The bucket plates are so shaped, with a transverse hollow, and of such size that no more than one pin will be received in each bucket. Balls received in the buckets are retained therein by the shroud 194 until the buckets reach the level of an opening 197 in the shroud, through which the balls roll to the delivery chute 172 and then back along the alley on the usual ball runway (not shown). The inclination of the buckets is not sufficient to cause any pins to slide from the bucket into that chute. In this way, the pins are separated from the balls, and the pins alone are carried to the higher reaches of the conveyor hoist for deposit in the pin storage units.

The drive for the pin gathering and hoisting means in the pit is the electric motor MH, mounted on the top front of the machine (see FIG. 2), which turns sprockets 188 that engage chains 186 of the pin and ball hoist conveyor 171. This motion is, of course, transmitted through the chains and chain pins to the sprockets 188 at the back of the pit (see FIGS. 24, 24a and 24b). The latter sprockets are mounted on an extended shaft 188a (see FIGS. 24a and 24b), which through gearing and chains drives all the pin handling devices in the pit, as follows. One end of shaft 188a is drivingly connected by bevel gear 165 to a shaft 174a, which moves pit conveyor 174 in the direction indicated by the arrows. On the other end of shaft 188a is mounted a sprocket 188b, which is drivingly connected by a chain 166 to a sprocket 175a, the latter moving conveyor 175 in the direction indicated. The third conveyor 178, tuck-in conveyor 195, paddle wheel 179, and disc 180 are belt driven, directly or indirectly, from a sprocket 174b on shaft 174a. A second chain 167 is mounted on sprockets 174b and 195a to provide a direct drive for the tuck-in conveyor 195. Midway between those two sprockets, the chain 167 also engages the top of a sprocket 179a to drive the paddle wheel 179 in the direction indicated. A second sprocket 195b, mounted on the opposite end of the same shaft as sprocket 195a, engages a third chain 168 for driving disc 180 and conveyor 178. This chain 168 passes around idler sprocket 169 and 190 and also around sprocket 178a (for driving conveyor 178) and engages sprocket 180a (for driving disc 180). In this way, all of the pin handling equipment in the pit is operated from a single drive source in the proper direction.

*Pin Storage Magazine*

The pin storage magazine 200 (see FIGS. 1–2 and 25–30) is mounted at the top of the main frame 5, beneath a horizontal run of the pin hoist conveyor 171. It consists of five pairs of side-by-side cylindrical pockets or tubes 201, arranged in two rows of five tubes each (see FIGS. 1 and 26). One of these pairs is shown in FIGS. 26 and 28, with a portion of two adjacent pairs appearing in FIGS. 25 and 27. Each pair of tubes is sometimes referred to herein as a storage unit. The two tubes in each unit have their axes slightly inclined to each other and are joined together by plates 202 and 203 welded respectively to the front and back of the tubes, and by a flat horizontal plate 204, with sloping skirts 205, welded to the adjacent top edges of the tubes. Each storage unit is suspended on a common pivot rod 206, passing through plates 202 and 203, and supported on cross members of the frame. This rod may be located below the center of gravity of each storage unit, so that the units when empty will tilt either to the left or right to reach a stable position; or, if desired, all of the units can be weighted slightly on one side, so as to tilt when empty in a given direction. When tilted in either direction, one of the tubes 201 will be centered directly below the pin conveyor for receiving a pin.

Pins are delivered to the storage units in a horizontal position from the vertical pin conveyor hoist 171 shown in FIG. 24, after travelling through the curved portion of that conveyor (see FIG. 1) where the pins are retained in the bucket plates by a curved shroud 207 beneath the conveyor. At the beginning of the conveyor's horizontal reach above the storage units, where the shroud ends, the pin neck slides on one of the spaced parallel rails 208 extending horizontally above the storage units and the base of the pin abuts the inner side of the other rail, both rails being supported by sections of the main frame 5. The upper edges of these rails are received in the outer slots 196 of the bucket plates and act as guides for those plates, while the plates push forward the pins. Under this urging, the first pin will drop base first into the first empty pocket of a tilted storage unit, and is held therein by means described below. Its weight immediately unbalances the storage unit and causes it to tilt in the opposite direction, disposing the second pocket of the unit into position for receiving another pin (see FIG. 28). When each pocket has received a pin, the center of gravity of the storage unit will be below the supporting pivot rod 206; and, the pins being of substantially the same weight, the unit centers itself in the position shown in FIG. 26. In this position, the space immediately below the pin conveyor hoist is closed by the flat top plate 205 between the tops of the pockets, and this plate serves as a bearing surface over which additional pins are advanced by the conveyor until a full complement of ten pins has been put in storage. Additional pins that may thereafter be brought up from the pit are carried by the pin conveyor entirely through the storage compartment and are discharged into a chute 209 (see FIG. 1) at the front of the machine and returned by a conveyor 210 to the pit.

The pins are retained in the storage pockets by a latch 211, best shown in FIGS. 25 and 27. The latch includes a horizontally disposed finger 212, slidably received in a sleeve 213 secured to and passing through the wall of the tube 201 and the back plate 203. The outer ends of the latching fingers 212 of the two adjacent pockets in a storage are connected to a latch release member 216 in the form of an inverted V, as shown in FIG. 26. The latch release member for each storage unit is slidably mounted on the pivot rod 206 by means of a flanged bearing 218. The groove 219 in the outer edge of each bearing (see FIG. 27) is engaged by the edge of a disc 221 rigidly mounted on a common control rod 222 above and parallel to the pivot rod 206. The control rod is slidably mounted in holes (not shown) in cross members 223 supported by the main frame and can be moved back and forth, as explained below, to latch and release pins held in the pockets.

The control rod 222 and the latch release member 216, operatively connected thereto, also perform another function. During the pin releasing operation, when the control rod and latch release move forward in FIG. 25 and to the left in FIG. 27, the inverted V arms of the latch release are engaged by one or both of the centering rods 224 mounted between adjacent cross pieces 223. These rods converge in the direction of motion of the control rod 222 and serve to center the storage unit and to hold it centered while pins are discharged from the unit to the pin chutes 226 which deliver them to the pin setting tubes 132 (see FIGS. 1 and 29).

In some cases, it may be desirable to lock the storage units in a centered position as soon as they are filled, without waiting to do so until the pins are about to be released. As previously stated it is preferable that the storage units be weighted on one side, so that empty units will all tilt in one direction; but this weight will disturb the balance of the unit to some extent when the unit is filled with pins and provide an uneven runway for other pins pushed by the pin conveyor 171 along the top plates 204 of filled storage units. To avoid this result, a storage unit latch 230 may be pivotally mounted on a member 231 supported by the frame adjacent the unweighted pocket tube in each storage unit. If the right hand pockets of all units are weighted with a weight W (see FIGS. 26 and 28), so that empty units will tilt to the right (in FIG. 26). The left hand pocket will receive the first pin, this pin will strike the side of a latching bar 236, pivotally mounted on the outside of the tube and with its lower end urged by a spring 237 to project into the tube through a slot 238 in the tube wall. The bowling pin will force the foot 239 of the latching bar outward into position to engage the latch 235. As the storage unit tilts to the left from the weight of the pin in the left pocket, the latching bar hits the top of latch 235, which is normally held in the position shown in FIG. 26 by a spring 241 and a stop 242, forcing the latch down so that the latching bar goes past it (and the latch returns to its normal position). When a pin is received in the right hand pocket, the unit will rotate clockwise but the latching bar will then engage the open jaw of the latch 235 and hold the unit in a centered position against the tendency of the momentum of the system or of the weight W, or of both, to tilt the unit to the right of that position. When the pins are released from the unit, latch bar 236 disengages from the latch 235, and the unit tilts to the right, ready to receive another complement of pins from the pit.

The pins are released from the storage units by moving the control rod backwards (to the left in FIG. 27), withdrawing the fingers 212 from engagement with the bands of the duck pins (or the sides of standard pins). The pins then fall into the upper open ends of pin chutes 226, some of which, as shown schematically in FIG. 29, are angularly disposed for delivering the pins to the triangular array of setting tubes 132. The release of pins from the storage units is effected, whenever the main carriage 50 moves to its rear, pin-setting position, by the means shown in FIG. 30.

In FIG. 30 are shown the rear ends of the control rod 222 and the pivot rod 206. A block 250 is secured to the control rod and slidably receives the pivot rod. A bracket 251, mounted on a turning rod 252 supported by the main frame, is provided with a transverse bar 253 that engages the front of block 250. As a result, when the rod 252 and its supported bracket 251 are turned in a clockwise direction, the control rod 222 is pulled to the rear to center the pin storage units and release the pins therein, as previously described. Rod 252 is turned by the lever arm 254 attached to one end of the rod and pivotally connected to a push rod 256, which slides in a vertically extending slot 257 in a member 258 attached to the main frame. The free end of push rod 256 is adapted to be engaged by a post 259 on the main carriage 30, just before that carriage reaches its extreme back, pin-setting position (elevator 10 being in its top position). As the carriage continues to move to the rear, it moves the push rod to release the pins in the storage units, as described above. When the carriage again moves forward, after the pins have been released, a strong spring 261 connected between the fixed pivot rod 206 and arm 262 of bracket 251 returns the control assembly to its normal pin-latching position.

It may be desirable at the end of a day's bowling to shut off the apparatus with the main carriage in its back position but without releasing pins from the storage units into the pin setting tubes 132, so that the alley will be empty of pins and the sweep 110 will be raised to its normal play position. This result is obtained by the mechanical linkage shown in FIG. 30. One of the side arms 114 of the sweep is adapted when in its raised play position to engage a pin 270 attached to a bell crank pivoted on a bearing 272. The free end of the crank is connected by a push-pull cable 273 to a second bell crank 274. A pin 276 on the latter is adapted to raise bar 256 in slot 257 of member 258, when the sweep is up, thereby lifting the end of that bar above the top of post 259 on the main carriage. In this way is prevented the release of pins from the storage units.

Electrical Circuit and Controls

The operation of the various components of the machine by the electric motors previously identified, including the sequence in which they are operated to conform to the rules of the game, is controlled electrically through a motor driven cam sequence switching unit, relays, and limit switches, together with sensing switches to detect the presence or absence of standing and leaning pins after a ball is rolled. These and other elements of the control circuit are shown schematically in FIG. 31.

The cam unit is conventional and includes seventeen cam discs mounted on a common shaft driven by an electric motor through reduction gearing. Each cam disc has one or more lobes adapted to actuate a cam switch when the cam shaft is turned through the appropriate angle. There are nineteen cam lobe positions. Since the cam unit, per se, is conventional, only the cam motor and the cam switches are shown in the drawing. The cam motor is so labelled. The cam switches, seventeen of them, are designated by the prefix C-, followed by one or more code letters identifying the function to which each relates. A list of these switches and their related functions is given in the cam sequence chart of FIG. 32.

The control and power relays that operate the various elements of the machine are designated by the prefix R-, followed by function-identifying code letters similar to those used with the cam switches. To simplify the drawing of the circuit, the energiizng coil of each relay is generally separated in the wiring diagram from the contacts it controls; but the latter are identified by the prefix RC-, followed by the same code letters as their associated relay coils. Mechanically actuated limit switches are identified by the prefix L-, followed by the same functional code letters.

In the wiring diagram all switches and relay contacts are shown in their normal non-actuated or non-energized positions, which may be open or closed with respect to one, or in some cases two, circuits. It will be understood that, when a switch is actuated or a relay is energized, the open or closed positions of these switches and contacts will be the reverse of what is shown in the drawing. In addition, in the wiring diagram, the "hot" line conductors (when manual switch T is closed) are shown in heavy lines as compared with conductors that are hot only when other switches and relay contacts are closed.

At the start of a game with pins set ready for play, the cam unit is in position #1 (see cam chart of FIG. 32), in which normally open cam switch C-FL is closed by the appropriate cam. When the first ball is thrown, it will contact a flipper strip 300 extending across the back edge of the pin deck and the adjacent gutters (see FIG. 24). The resulting movement of the flipper strip momentarily closes flipper switch FL, shown in the wiring diagram; and current flows from the power source through a manually closed off-on switch T, line conductor 301, closed cam switch C-FL, closed flipper switch FL, conductor 303, cam relay coil R-M, and line conductor 302 back to the power source.

Relay R-M is therefore energized, closing its holding contact RC-M1 (which maintains the energizing circuit after switch FL opens), and also closing its contact RC-M2 to energize the cam motor through line conductors 301 and 302, and at the same time opening its contact RC-M3 to disconnect from line 302 the other relays controlling the pin handling devices, thereby preventing the opeartion of those devices while the cam motor is running. The cam motor then turns the cam unit to position #2 (see FIG. 32), releasing switch C-FL, which returns to its normally open position deenergizing R-M to stop the cam motor.

Relay R-H is also energized by the closing of manual switch H, which remains closed throughout the game. Relay R-H, through its energized contacts RC-H1 and RC-H2 (shown in the upper left of FIG. 31), energizes motor MH, which operates the pin conveyor hoist continuously during the game.

It will be noted that cam switches C-G and C-N are normally in circuit closing positions for transmitting current from line 301 to conductor 303. However, these same circuits are also controlled by the contact switches of one or both of the relays R-A and R-G. For example, the circuit between cam switch C-G and conductor 303 is closed only when both RC-G and RC-A1 are closed (i.e. when R-G is not energized and R-A is energized). Similarly, the circuit between C-N and conductor 303 is closed only when RC-A2 is closed (i.e., when R-A is not energized). Accordingly, in cam position #1 where both R-A and R-G are energized (R-A being connected between line conductors 301 and 302 through closed limit switch L-ED2 and conductor 311, and R-G being connected between those same line conductors through each of the limit switches L-P1A to L-P10A and conductor 310. Therefore, both RC-G and RC-A2 are open and the circuits through C-G and C-N are not completed in cam position #1. Unless otherwise stated below, these same circuits are open in all of the cam positions.

In cam position #2, the cam unit closes cam switches C-ED and C-SD to lower the elevator and to lower the sweep to its guard position by energizing relays R-ED and R-SD, respectively, between lines 301 and 302, through limit switches L-ED1 and L-SD, respectively, conductor 304, and normally closed cam relay contact RC-M3. The relays R-ED and R-SD, through their contacts (shown in upper right portion of the wiring diagram), energize the elevator and sweep motor circuits (shown beneath the contacts referred to).

The elevator motor circuit includes a reversible motor ME with separate running and starting windings. With relay R-ED energized, current flows from line 301 through RC-ED1 (energized), conductor 305, the running winding of motor ME, conductor 306, and RC-ED2 (energized) to line 302. Current also flows from line 301 through RC-ED1 (energized), RC-EU1 (not energized), the starting winding of motor ME, RC-EU2 (not energized), and RC-ED2 (energized) to line 302. Motor ME accordingly rotates in a direction that will lower the elevator, which continues to go down until it trips limit switch L–ED1, thereby opening the circuit to relay coil R–ED, which in turn opens the circuit to motor ME.

In the same way, the reversible sweep motor MS is operated by current from the line conductors to the running winding of MS through the energized contacts RC–SD1 and RC–SD2 and to the starting winding through those same contacts and the non-energized contacts RC–SU1 and RC–SU2. Motor MS accordingly rotates in a direction that will lower the sweep to its guard position where it trips limit switch L–SD, thereby opening the circuit to R–SD, which in turn opens the circuit to motor MS.

After the rolling of the first ball, the following play positions are possible: (1) all ten pins remain standing, as in the case where the ball rolled along the gutter of the alley, (2) all pins have been knocked down, or (3) some pins have been knocked down but one or more are left standing or leaning. When the elevator is lowered as described above, the machine is adapted to discriminate between the above positions and to control its subsequent cycles accordingly. This capability of the machine resides in limit switches actuated by the clamping pads 33. There are ten such switches L–P1A to L–P10A, one for each of the pads; and they may be mounted in any convenient way, as on the sleeves 36 supporting the pads. The switches are actuated either by the pads, or their supporting rods 34, when the pads are lifted by engaging the head of a standing or leaning pin. These limit switches are single pole, double throw switches and normally occupy the left hand positions shown on the bottom left hand portion of the wiring diagram. The switches are connected in parallel to line 301; one group of contacts are connected in parallel to conductor 310; and the other group are similarly connected to conductor 311.

*Gutter ball cycle.*—When none of the pins has been hit by a rolled ball at the beginning of a frame, the lowering of the elevator as above described will cause all of the pad limit switches to be actuated by the standing pins, breaking the normally closed connection between line 301 and conductor 310, to deenergize relay R–G; and reconnecting line 301 to conductor 311, the connection through L–ED2 having been broken by the tripping of the latter switch when the elevator reached its bottom position. R–A therefore remains energized, but R–G does not, and current flows from line 301, through normally closed cam switch C–G, normally closed contact RC–G and energized contact RC–A1, to conductor 303 to energize R–M between conductor 303 and line 302. With relay R–M energized, the cam motor again rotates to advance the cam unit until it reaches position #9, where it opens normally closed cam switch C–G and breaks the circuit to R–M to stop the cam motor.

When the cam unit stops in position #9, normally open cam switches C–EU and C–SU are also actuated, closing the appropriate motor circuits to raise the elevator and sweep for the resumption of play. The closing of switch C–EU energizes relay R–EU, which through its energized contacts RC–EU (cooperating with the non-energized contacts of R–ED) supplies current to motor ME, the current passing through the starting winding in a direction opposite to that when R–ED was energized. The elevator is accordingly raised to its top position. Similarly, the closing of switch C–SU energizes relay R–SU, which operates sweep motor MS in a reverse direction to that previously described, to raise the sweep. When the elevator and sweep each reaches its top position, the tripping of limit switches L–EU and L–SU stops the elevator and sweep motors. The tripping of L–EU also energizes R–M to advance the cam unit to position #10. Play then resumes, with the rolling of a second ball. If the second ball thrown is also a gutter ball, a similar action takes place to advance the cam unit through position #11 and #12 (similar to positions #1 and #2) and then to position #18.

*Strike cycles.*—If all pins are knocked down after the first ball with the cam unit in position #2 (elevator and sweep down), then none of the pad limit switches will be actuated; and, with limit switch L–ED2 opened by the descent of the elevator, there will be no current in conductor 311, so that R–A will be deenergized and its contact RC–A2 will be in its non-energized closed position, completing a circuit from line 301, through normally closed cam switch C–N, normally closed RC–A2, R–M, and line 302. This energizes R–M, which causes the cam motor to advance from position #2 until it reaches position #12, where cam switch C–N is opened to deenergize the cam motor circuit.

With the cam unit in position #12, cam switch C–EU is also actuated, so that the elevator goes up, as previously described in connection with cam position #9; but the sweep remains down in its guard position. When the elevator reaches its top position, it actuates limit switch L–EU, deenergizing relay R–EU to open the circuit motor ME and at the same time energizing relay R–M to close the circuits to the cam motor which advances the cam unit to position #13, where C–EU returns to its normally open position to stop the cam motor. R–A is energized with the return of L–ED2 to its normal closed position when the elevator goes up, so that the circuit through C–N to R–M is broken.

In position #13, cam switch C–SI is actuated, causing the sweep to move inward from its guard position to the back of the alley, to clear the alley and gutters of fallen pins. This is done by energizing R–SD through now closed C–SI and through L–SI in its normal position. Motor MS is thereby energized, which turns in the same direction as when the sweep comes down to its guard position, as described in position #2. When the sweep is at its extreme back position, it trips L–SI, which opens the circuit to R–SD to stop motor MS and closes a circuit to R–M to advance the cam unit to position #14, where C–SI returns to its normally open position to stop the cam motor.

In position #14, cam switches C–CB1 and C–SO are actuated. Relay R–CB is energized by current from line 301 passing through C–CB1, limit switch L–FM (which is closed when the pin storage magazine is filled with a complement of ten pins), and limit switch L–CB1 in its normal position. The energizing of R–CB causes motor MC to rotate in a direction that will move the main carriage back until the circuit to relay R–CB is opened by actuation of limit switch L–CB1. The closing of cam switch C–SO, in this same position #14, energizes relay R–SU (after L–CB1 is tripped to its right hand position) to move the sweep from its previous back position to its guard position. Relay R–SU receives current from line 301 through actuated C–CB1, closed L–FM, L–CB1 (right hand position), closed C–SO, and L–SO (left hand position). Current then flows to the sweep motor MS, which rotates in the same direction as in moving the sweep up to move the sweep to the front of the pin deck, where L–SO is tripped opening the circuit to relay R–SU and closing a circuit through conductor 303 to R–M, which causes the cam unit to advance to position #15, where C–OS resumes its normally open position to stop the cam motor.

In position #15, the cam unit actuates cam switches C–SU, C–S, and C–BP. When manual switch K is closed (as it normally will be), then cam switches C–SU and C–S are in effect inoperative and the operation is determined by cam switch C–BP, which controls a bypass circuit through manual switch K to energize R–M and advance the cam unit through positions #15 and #16 to position #17, where C–BP returns to its normal open position and stops the cam motor. The operation with manual switch K in its open position is described later herein.

In position #17, the cam unit actuates C–ED, C–SD, and C–N. The first two of those switches, as previously described in connection with position #2, lowers the sweep to its guard position and lowers the elevator (main carriage now back) to its bottom position, where the tube setting carriage releases a new set of pins onto the pin deck. When the elevator reaches its bottom position, it actuates L-ED1 to advance the cam unit to position #18. C-N is actuated in both positions #17 and #18 since R-A is deenergized with the openings of L-ED2 when the elevator is in its down position.

In position #18, the cam unit actuates C-EU and C-SU to raise the elevator and sweep, as previously described in connection with position #9. When the elevator is fully raised, limit switch L-EU is shifted into its right hand position and the cam unit advances to position #19, where C-EU returns to its normal open position to stop the cam motor.

In position #19, the cam unit actuates C-CF1, which closes a circuit through L-CF1 (left hand position) to R-CF, operating the carriage motor MC to return the main carriage to its normal forward position where it trips L-CF1 to its right hand position, opening the carriage motor MC circuit and closing the cam relay R-M circuit to advance the cam unit back to position #1 (where C-CF opens) for the start of a new frame of bowling.

*Normal cycle.*—Normally, each frame consists of a two ball cycle, in which the first ball knocks down some pins, but one or more pins are left standing or leaning. This is the third possible condition that can prevail when the cam unit is in position #2. In such event, one or more but less than all of the pad limit switches L-P1A to L-P10A will be moved from their normal left hand positions to their right hand positions by engagement of their associated clamping pads with the heads of standing or leaning pins. In this situation, both conductors 310 and 311 will be connected to line 301, regardless of the position of L-ED2, and R-A and R-G will both be energized. Since C-ED is actuated by the cam unit in position #2, and since L-ED1 is in its right hand position when the elevator is down, R-M is energized and advances the cam unit to position #3, where C-ED returns to its normal open position.

In position #3, R-A and R-G remain energized, the circuits through C-G and C-N are open (since RC-G and RC-A2 are open), and the cam unit actuates C-CF2 to move the pin lifting carriage forward. Current flows from line 301 through closed C-CF2 and L-CF2 (left hand position) to energize R-CF, which operates the main carriage motor MC to advance the pin lifting carriage until in its front pick up position it trips L-CF2, opening the circuit to R-CF and closing that to R-M. The energization of the latter advances the cam unit to position #4, where it is stopped by the opening of C-CF2.

In position #4, the cam unit closes C-EU; and the elevator is raised, as explained in the gutter ball cycle in connection with cam position #9. The standing and leaning pins are accordingly lifted from the pin deck. When the elevator reaches its top position, it trips L-EU to its right hand position, stopping the elevator motor and advancing the cam unit to position #5, where C-EU is opened to stop the cam motor. R-A is energized, but not R-G, so no circuits are closed through C-N or C-G.

In position #5, the cam unit closes C-SI to energize R-SD to move the sweep to the back of the alley, as explained in the strike cycle for position #13. The sweep on reaching its back position trips L-SI to open the sweep motor circuit and close the cam motor circuit to advance the cam unit to position #6, where C-SI returns to its normal open position.

In position #6, the cam unit closes C-SO to energize R-SU through L-SO (left hand position) to move the sweep out to its guard position, where it trips L-SO to its right hand position to actuate the cam unit as previously described in the strike cycle for position #14.

The cam unit then moves to position #7, where it stops with the return of C-SO to its normal open position.

In position #7, the cam unit closes C-ED to energize R-ED through L-ED1 (left hand position). This brings the elevator down to reset the pins that had been previously lifted by the pin lifting fingers. When the elevator reaches its bottom position, L-ED1 is moved to its right hand position, closing the cam relay circuit which advances the cam unit to position #8, where the cam motor circuit is opened by the return of C-ED to its normal open position. Both relays R-A and R-G are energized so long as the elevator is in its down position.

In position #8, the cam unit closes C-CB2 to energize R-CB through L-CB2 (left hand position), thereby operating the carriage motor to move the pin lifting carriage to its back position relative to the main carriage, where the lifting fingers are out of engagement with the necks of the standing pins. When the pin lifting carriage reaches this back position, L-CB2 is tripped to its right hand position, again energizing the cam unit to advance the latter to position #9, in which the elevator and sweep are raised as previously described. Play then resumes with the pins left standing after the first ball.

When a second ball is thrown in the normal cycle just described, the pin setting apparatus goes through the operations previously described for cam positions #10–#19 to complete the frame.

*Miscellaneous controls.*—Near the end of the bowling day or if desired, in the last frame of each game, a stop cycle can be introduced by opening manual switch K in the bypass circuit. The machine will then stop in position #16 with the alley swept clear of pins and balls and with the pin setting and resetting devices in their normal raised position and with the pin setting tubes and the magazine each holding a full complement of ten pins. Later, when switch K is closed, the sweep will be lowered to its guard position and ten pins will be set as at the end of a normal cycle. This situation results from the following operations of the electrical circuit. As the cam unit advances from position #14, with switch K open, the unit will stop in position #15 on the return of C-SO to its normal open position. In position #15, C-SU and C-S are actuated. The former causes the sweep to be raised to its top, play position, as described in positions #9 and #18. In doing so, the sweep trips L-SU to its right hand positions and completes a circuit through L-SU in that position and through actuated C-S to advance the cam unit to position #16, where the return of C-SU and C-S to their normal open positions stops the cam motor. In position #16, only C-BP is actuated by the cam unit and, since switch K is open, the machine stops. With the sweep raised, linkage 270-276 (see FIG. 30) has inactivated rod 256, permitting the pin storage units to receive another complement of pins without transferring them to the pin setting tube which have already received a full complement of pins when the main carriage moved to its back position in position #14.

In addition, manual switch X can be momentarily closed at any stage of the game to sweep the alley and set ten new pins. Such a control is desirable where a pin falls down of its own accord during a setting operation, or when for any other reason it is desired to place a new set of pins in playing position. With the closing of switch X, relay R-X is energized, actuating its contacts RC-X1 and RC-X2. Contact RC-X1 completes a holding circuit that maintains relay R in its energized state (through C-N in its normal position) after switch X is released. Also, contact RC-X2 completes a circuit to the cam relay R-M, so that the cam unit will advance to position #12 (where cam switch C-N is actuated to open the circuit to R-M and the holding circuit to R-X), to begin a strike cycle as previously described.

*Indicator panel.*—FIG. 33 is a wiring diagram of the indicator circuit that may be used in connection with the circuit of FIG. 31 to show the status of the game during any frame. Certain terminals in both wiring diagrams are identified by the same numerals indicating that they are electrically connected.

The indicator circuit includes a transformer 370 whose primary terminals 365 and 366 are connected respectively through terminals identified by the same numbers to lines 301 and 302 of the circuit shown in FIG. 31. A 50-volt tap on the secondary of this transformer is connected to each of eleven latch-type relays R1 to R10 and RB, which actuate their similarly identified contacts to open or close individual circuits. These contacts remain in their actuated positions until mechanically reset in their original positions by an indicator reset relay R–IR (the mechanical resetting connection being shown by a broken line in FIG. 33). The same tap of the transformer is also connected to strike and spare relays R–ST and R–SP, respectively, through innerconnected contacts of those same relays and through terminals 351 and 352 in FIG. 31, which are connected together through RC–A3 whenever relay R–A is not energized.

A series of indicator lights numbered L1 to L10 identify the ten bowling pins in accordance with standard convention. Two additional lights marked L–1st and L–2nd, respectively, indicate whether the next ball to be rolled by the player is the first or second bale of a frame. Two other lights designated L–SP and L–ST indicate if a spare or a strike, respectively, has been made by the ball just thrown. These indicator lights are connected across the six-volt tap of the transformer and are controlled by the indicator relay contacts as shown on the drawing.

The indicator circuit works as follows. When the game starts by the throwing of the first ball, the cam unit moves from position #1 to position #2 and, in so moving actuates cam switch C–IR (as indicated by the symbol on the chart of FIG. 32), to energize relay R–IR by current from line 301 through terminal 365 and by current from line 302 through closed switch C–IR (FIG. 31) and terminal 364. With the energization of R–IR, all of the indicator relay contacts in FIG. 33 will be reset and assume the open or closed positions shown in that figure. When the cam unit comes to rest in position #2, cam switch C–FR is actuated and closes its left hand contact (FIG. 32), thereby closing a circuit from line 301 through terminal 363 to energize relay R–B, the contacts of which control the first and second ball indicator lights. With the energization of that relay, the normally closed circuit to the 1st ball light through RC–B1 is opened (and that light goes out), while the normally open circuit to the 2nd ball light through RC–B2 is closed and that light comes on, indicating that the next ball will be the second ball of the frame. When the elevator comes down in cam position #2, clamping pads 33 on the main carriage will sense the presence or absence of standing pins as previously described. Assume that pin number 1 alone is standing; switch L–P1B will then be closed (see FIG. 31), and current will flow from line 301 through that switch and terminal 353 to energize latch relay R1 (FIG. 33). Its contact RC–1a and RC–1b will be actuated. RC–1a will open to disconnect the relay from its energizing circuit; but, since it is a latch relay, its contacts remain in their actuated positions until reset by energization of relay R–IR. Its contact RC–1b will close, closing the circuit to indicator light L1, to indicate that the first pin alone remains standing. Similarly, other light indicators would be lit, corresponding to the pins left standing or leaning, e.g., all of the lights L1 to L10 would be lit if the ball had missed all of the pins and rolled down the gutter.

Assume that in cam position #2, no pin is left standing after the first ball, i.e. there was a strike. None of the light indicator relays will then be energized, and none of the indicator lights 1 to 10 will be lit. However, the strike light L–ST will be lit by the closing of the strike relay contact RC–ST1 in the indicator light circuit. That contact is actuated by the energization of relay R–ST, as follows: current from the 50-volt tap of the transformer is carried by conductor 371 to terminal 352, then through closed relay contact RC–A3 (R–A is deenergized) to terminal 351 (see FIG. 31), then through normally closed relay contact RC–SP3 to one side of relay R–ST; the other side of that relay obtains current from terminal 365 (which is connected to line 301), conductor 372, and closed contact RC–B3 (R–B being energized). The energization of R–ST not only closes the indicator light ST (RC–ST1 being actuated), but also closes contacts RC–ST2 to RC–ST4 in the upper portion of FIG. 33. RC–ST2 connects one side of relay R–ST to terminal 350, which carries current from line 301 when cam switch C–FR is non-actuated, as it is after cam position #2. Accordingly, relay R–ST will remain energized after the cam unit moves from position #2, since the other side of that relay will then receive current from the 50-volt tap of the transformer, conductor 371, now closed contact RC–ST4, and normally closed contact RC–SP3, indicating that a strike has been made. The machine will then go through the strike cycle previously described in connection with FIGS. 31 and 32.

After the rolling of a second ball (assuming no strike was made on the first ball), cam switch C–IR is again closed between cam positions #10 and #11 to energize relay R–IR which will reset all the pin light indicator relays and relay R–B. This will close the circuit to the first ball light and open the circuit to the second ball light, indicating that the next ball to be thrown is the first ball (of the next frame). If the second ball knocks down one or more, but less than all, of the pins left standing or leaning after the first ball, the pin indicator lights will show by number which pins are left standing at the end of the frame, just as they did after the rolling of the first ball. On the other hand, if the second ball has knocked down all of the remaining pins, the fact that a spare has been made will be indicated by the spare light L–SP, as follows: R–SP will be energized by current from terminal 365 (line 301), conductor 372, and normally closed contact RC–B4 (R–B having been reset), and from the 50-volt tap of the transformer through conductor 371, terminal 352, closed contact RC–A3 (see FIG. 31), terminal 351, and normally closed contact RC–ST3. The energization of R–SP will then actuate the RC–SP contacts, causing the SP light to light up and maintaining a holding circuit to R–SP through RC–SP2 and terminal 350, as previously described in connection with the strike indicator relay R–ST. After the throwing of the first ball in the next frame and the actuation of cam switches C–FR and C–IR, the process is repeated.

It is among the advantages of this invention that the apparatus involved is compact and mechanically efficient, performing all of the operations described with a minimum of waste motion. The machine also handles leaning pins in accordance with playing rules and otherwise operates in accordance with such rules in setting and resetting pins. The machine is also economical to manufacture and reliable in operation.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Bowling pin handling apparatus for use in connection with a bowling alley, said apparatus comprising a vertically movable main carriage, a plurality of vertically yieldable clamping pads mounted on the main carriage and adapted upon the lowering of that carriage to a first predetermined level to engage initially the heads of on and off-spot unfelled pins on the alley and adapted on continued downward movement of the carriage to a lowermost position to clamp the engaged pins to the alley, a pin lifting carriage mounted for forward and backward movement on the main carriage and for vertical movement with that carriage, a plurality of pin lifters each of which is provided with a pair of spaced horizontally extending fingers having a pin receiving portion in which the fingers are spaced apart a distance greater than the width of a pin neck but less than the maximum width of a pin head, means for movably supporting each pin lifter on the pin lifting carriage for free and independent lateral movement with respect to said carriage when the pin lifter is unencumbered by the full weight of a pin, said means supporting each pin lifter at such a height relative to the main carriage that its fingers will receive the neck of an unfelled pin when the main carriage is in its lowermost position and the pin lifting carriage is advanced relative to the main carriage and will liftingly engage the head of said pin only after the main carriage has been raised to a second predetermined level above said first predetermined level, means for moving the pin lifting carriage horizontally relative to the main carriage when the latter is in its lowermost position, and means for elevating the main carriage thereby to disengage the clamping pads from the heads of unfelled pins before the pin lifters engage the heads of those pins and lift them from the alley, the clamping pads remaining disengaged from the pins during the lifting operation.

2. Apparatus for resetting bowling pins on a bowling alley, said apparatus comprising: a vertically movable main carriage; a plurality of vertically yieldable clamping pads mounted on the main carriage and adapted, upon the lowering of that carriage, first to engage the heads of on and off-spot unfelled pins on the alley and then, on continued downward movement of the carriage through a predetermined distance to a lowermost position, to yield vertically relative to the carriage and clamp the engaged pins to the alley; a pin lifting carriage mounted for forward and backward movement on the main carriage and for vertical movement with that carriage; a plurality of pin lifters, each of which is provided with a pair of spaced horizontally extending fingers having a pin receiving portion in which the fingers are spaced apart a distance greater than the width of a pin neck but less than the maximum width of a pin head; a plurality of spaced parallel cross rails extending transversely of the pin lifting carriage and connected thereto; means for slidably supporting each pin lifter for free and independent lateral movement on a cross rail when the pin lifter is unencumbered by the full weight of a pin, said means supporting each pin lifter at such a height relative to the main carriage that its fingers will receive the neck of an unfelled pin when the main carriage is in its lowermost position and the pin lifting carriage is advanced relative to the main carriage and will liftingly engage the head of said pin only after the main carriage has been raised above its lowermost position a distance greater than said predetermined distance; means for moving the pin lifting carriage horizontally relative to the main carriage when the latter is in its lowermost position; and means for elevating the main carriage, thereby to disengage the clamping pads from the heads of unfelled pins before the pin lifters engage the heads of those pins and lift them from the alley, the clamping pads remaining disengaged from the pins during the lifting operation.

3. Apparatus according to claim 2, in which the cross rails have two opposed parallel edges forming bearing surfaces, and in which the means for supporting each pin lifter on a cross rail include a bracket secured to the rear end of the pin lifter, rollers rotatably mounted on the bracket and engaging the bearing surfaces of the cross rail, and retaining means for holding the rollers on the cross rail.

4. Apparatus according to claim 3, in which said retaining means include flanges on the rollers for engaging opposite sides of the cross rail adjacent the bearing surfaces.

5. Apparatus according to claim 2, in which the cross rails are inclined forwardly and have two opposed parallel bearing surfaces one of which is ahead of the other, and in which the means for supporting each pin lifter on a cross rail include a bracket secured to the rear end of the pin lifter, rollers rotatably mounted on the bracket and engaging the bearing surfaces of the cross rail, and retaining means for holding the rollers on the bearing surfaces.

6. Apparatus for resetting bowling pins on a bowling alley, said apparatus comprising a vertically movable main carriage a plurality of vertically yieldable clamping pads mounted on the main carriage and adapted upon the lowering of that carriage to a pin engaging level to engage initially the heads of on and off-spot unfelled pins on the alley and then on continued downward movement of the carriage to a lowermost pin clamping position to clamp the engaged pins to the alley, a pin lifting carriage mounted for forward and backward movement on the main carriage and movable vertically with that carriage, a plurality of pin lifters each of which is provided with a pair of spaced horizontally extending fingers, said fingers having a forward aligning portion in which the fingers diverge laterally and a rear throat portion in which the fingers are substantially parallel and are spaced apart a distance greater than the width of a pin neck but less than the maximum width of a pin head, a plurality of spaced parallel cross rails connected to the pin lifting carriage, means for slidably supporting each pin lifter on a cross rail for free and independent lateral movement thereon when the pin lifter is unencumbered by the full weight of a pin, said means supporting each pin lifter at such a height relative to the main carriage that its fingers will receive the neck of an unfelled pin when the main carriage is in its lowermost position and will liftingly engage the head of said pin only after the main carriage has been raised above said initial pin engaging level, means for advancing the pin lifting carriage horizontally relative to the main carriage when the latter is in its lowermost position to guide each pin lifter into position to receive within its throat portion the neck of an unfelled pin, and means for elevating the main carriage thereby to disengage the clamping pads from the heads of unfelled pins before the pin lifters engage the heads of those pins and lift them from the alley, the clamping pads remaining disengaged from the pins during the lifting operation.

7. Apparatus according to claim 6, in which the adjacent fingers of the aligning portions of laterally adjacent pin lifters mounted on the same cross rail are slightly inclined to the horizontal in opposite directions to permit said fingers to overlap each other without interference.

8. Apparatus according to claim 6, in which centering means are provided for centering each pin lifter directly behind a spot position on the alley when the pin lifting carriage is moved from its front to its back position relative to the main carriage.

9. Apparatus according to claim 6, in which the means for supporting each pin lifter on a cross rail include a bracket secured to the rear end of the pin lifter, and rolling means rotatably secured to the bracket and engaging opposite edges of the cross rail, and in which the pin receiving portion of the pin lifter extends forward of the cross rail on which the pin lifter is mounted.

10. Apparatus according to claim 9, in which each cross rail is tilted forward so that a plane passing through the opposed bearing surfaces is inclined at an angle of substantially 45° to the horizontal.

11. Apparatus for resetting unfelled upright and leaning rubber band duck pins on a bowling alley, said apparatus comprising a vertically movable main carriage, a plurality of vertically yieldable clamping pads mounted on the main carriage and adapted upon the lowering of that carriage to an initial pin engaging level to engage the heads of on and off-spot upright pins on the alley and then on continued downward movement of the carriage to a slightly lower second level to engage the heads of leaning pins and on still further downward movement of the carriage to a lowermost pin clamping position to clamp the engaged upright and leaning pins to the alley, a pin lifting carriage mounted for forward and backward movement on the main carriage and movable vertically with that carriage, a plurality of pin lifters each of which is provided with a pair of spaced horizontally extending fingers adapted to receive loosely the neck of an unfelled pin and to engage liftingly the head of such a pin, a plurality of spaced parallel cross rails connected to the pin lifting carriage, means for slidably supporting each pin lifter on a cross rail for free and independent lateral movement thereon when the pin lifter is unencumbered by the full weight of a pin, said means supporting each pin lifter at such a height relative to the main carriage that its fingers will receive the neck of an upright or leaning pin when the main carriage is in its lowermost position and will erectingly engage the head of a leaning pin only after the main carriage has been raised above said second pin engaging level and will liftingly engage the head of an upright pin only after the main carriage has been raised above said initial pin engaging level, means for advancing the pin lifting carriage horizontally relative to the main carriage when the latter is in its lowermost position to guide each pin lifter into position to receive the neck of an upright or leaning pin, and means for elevating the main carriage to disengage the clamping pads from the heads of upright and leaning pins before the pin lifters engage the heads of those pins and to erect leaning pins before they and upright pins are lifted from the alley, the clamping pads remaining disengaged from the pins during the erecting and lifting operations.

12. Apparatus according to claim 11, in which the means for slidably supporting each pin lifter on a cross rail include a bracket secured to the rear end of the pin lifter, roller means mounted on the bracket and engaging opposite edges of the cross rail with the pin lifter depending from the cross rail and its pin lifting portion extending forwardly of the cross rail, whereby each pin lifter will be freely movable on the cross rail for centering itself about the neck of a clamped pin and for erecting a leaning pin, but will be less freely movable thereon when bearing the full weight of a lifted pin.

13. Apparatus according to claim 12, in which each cross rail is forwardly inclined so that one of the edges engaged by the roller means is ahead of the opposite edge.

14. Apparatus according to claim 11, in which the clamping pads extend below the level of the cross rails and are directly below a cross rail when the pin lifting carriage is in its forward position relative to the main carriage.

15. Apparatus according to claim 11, in which the means for slidably supporting each pin lifter on a cross rail include vertically extending means supporting the rear end of the pin lifting fingers and extending upwardly above the level of the clamping pads, a flat bracket secured at its lower end to the upper end of said means and also extending forwardly thereof in an inclined plane, roller means rotatably mounted on the bracket adjacent its upper and lower edges and rollingly engaging opposite edges of a cross rail, the cross rail being mounted above the level of the clamping pads and inclined forwardly so that its upper engaged edge is above and forward of the other engaged edge.

16. Apparatus according to claim 15, in which the roller means include flanged portions overlapping the sides of the cross rail adjacent said opposed edges, thereby to retain the roller means on the cross rail and permit the pin lifters to move freely thereon when unencumbered by the full weight of a pin and to restrain such free movement when bearing the full weight of a lifted pin.

References Cited in the file of this patent

UNITED STATES PATENTS

| | | |
|---|---|---|
| 1,449,012 | Lorenz et al. | Mar. 20, 1923 |
| 2,341,476 | Parra et al. | Feb. 8, 1944 |
| 2,530,385 | Frye | Nov. 21, 1950 |
| 2,622,879 | Frye | Dec. 23, 1952 |
| 2,629,595 | Anderson | Feb. 24, 1953 |
| 2,645,485 | Mead | July 14, 1953 |
| 2,656,187 | Blair | Oct. 20, 1953 |
| 2,672,341 | Flint | Mar. 16, 1954 |
| 2,702,707 | Frye | Feb. 22, 1955 |
| 2,723,123 | Hedenskoog et al. | Nov. 8, 1955 |
| 2,728,575 | Cross | Dec. 27, 1955 |
| 2,781,195 | Holloway et al. | Feb. 12, 1957 |
| 2,853,300 | Montooth et al. | Sept. 23, 1958 |